United States Patent
Bryson et al.

(10) Patent No.: US 11,714,691 B2
(45) Date of Patent: Aug. 1, 2023

(54) EXTENSIBLE COMMAND PATTERN

(71) Applicant: DreamWorks Animation LLC, Glendale, CA (US)

(72) Inventors: Stuart Bryson, Neutral Bay (AU); Esteban D. Papp, Trabuco Canyon, CA (US); Matthew C. Gong, Pasadena, CA (US); Kirk Lansman, Burbank, CA (US); Atul Patil, Indore (IN)

(73) Assignee: DreamWorks Animation LLC, Glendale, CA (US)

( * ) Notice: Subject to any disclaimer, the term of this patent is extended or adjusted under 35 U.S.C. 154(b) by 113 days.

(21) Appl. No.: 17/337,073

(22) Filed: Jun. 2, 2021

(65) Prior Publication Data

US 2021/0286661 A1    Sep. 16, 2021

Related U.S. Application Data

(62) Division of application No. 16/374,643, filed on Apr. 3, 2019, now Pat. No. 11,068,325.

(51) Int. Cl.
*G06F 9/54* (2006.01)
*G06F 9/50* (2006.01)

(52) U.S. Cl.
CPC ............ *G06F 9/543* (2013.01); *G06F 9/5005* (2013.01)

(58) Field of Classification Search
None
See application file for complete search history.

(56) References Cited

U.S. PATENT DOCUMENTS

| 6,061,067 | A  | * | 5/2000 | Silva ...................... G06T 13/20 |
| | | | | 345/619 |
| 11,068,325 | B2 | | 7/2021 | Bryson et al. |
| 2009/0260011 | A1 | | 10/2009 | Snover et al. |
| 2018/0012394 | A1 | * | 1/2018 | Averianov ........... G06V 30/194 |
| 2018/0130245 | A1 | * | 5/2018 | Kozlov ................... G06T 13/40 |
| 2018/0143756 | A1 | | 5/2018 | Mildrew et al. |
| 2019/0213776 | A1 | | 7/2019 | Banerjee et al. |
| 2019/0318523 | A1 | * | 10/2019 | Higginbottom ......... G06T 13/40 |

OTHER PUBLICATIONS

European Patent Office Application Serial No. 22182160.6, Search Report dated Feb. 24, 2023, 11 pages.

\* cited by examiner

*Primary Examiner* — Craig C Dorais
(74) *Attorney, Agent, or Firm* — Lee, Hong, Degerman, Kang & Waimey PC

(57) ABSTRACT

Systems and methods for implementing a command stack for an application are disclosed and an embodiment includes receiving an input for executing a first command of the application, initiating execution of the first command, executing one or more second commands which are set to execute based on execution of the first command, completing execution of the first command, and including the first command in the command stack such that an association is defined between the first command and the one or more second commands. In one embodiment, defining the association in the command stack between the first command the one or more second commands may include generating a first nested command stack associated with the first command, including the one or more second commands in the first nested command stack, and including the first command and the first nested command stack in the command stack.

17 Claims, 39 Drawing Sheets

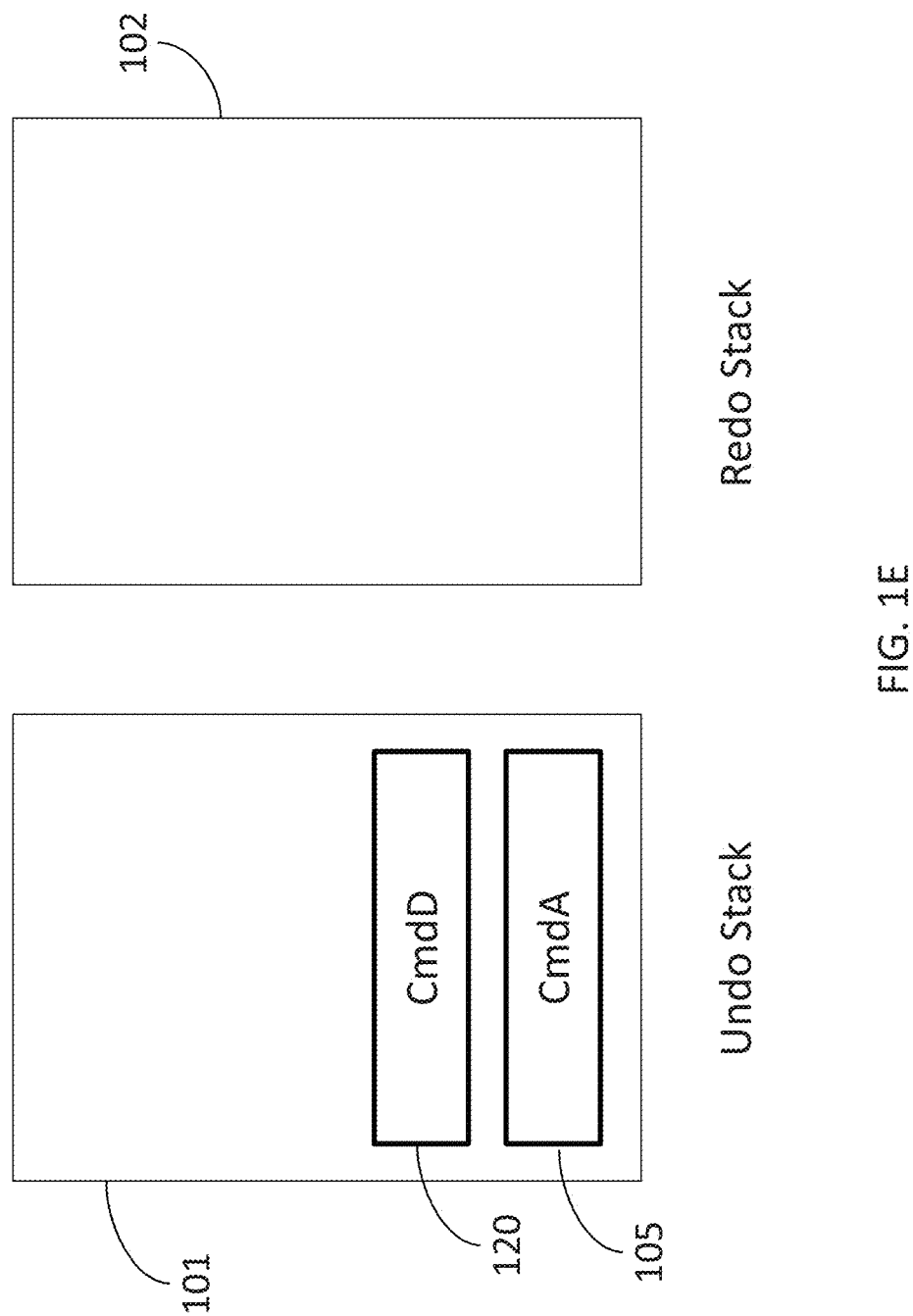

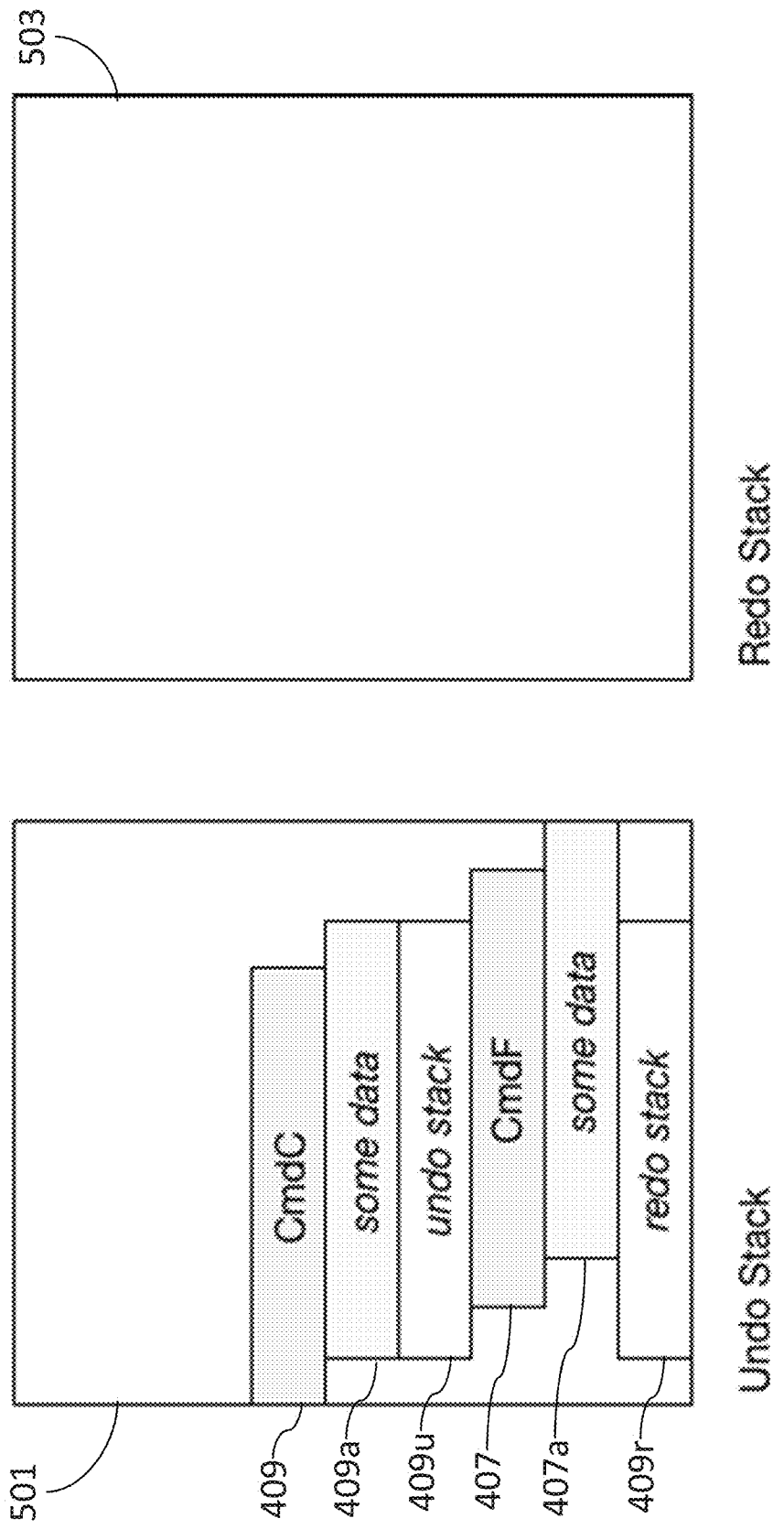

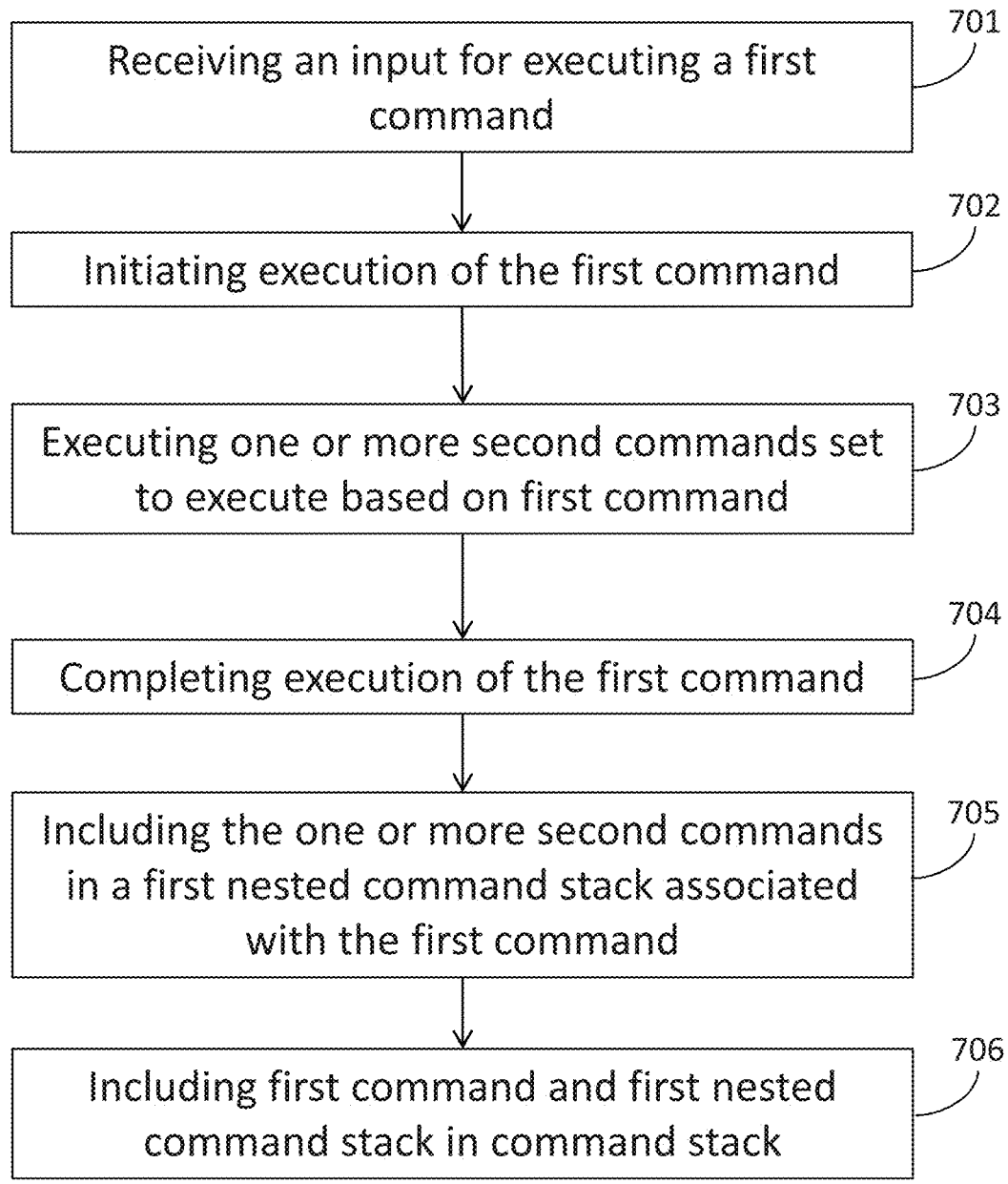

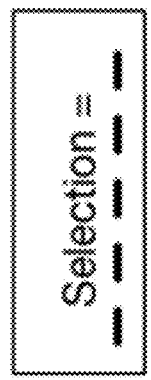
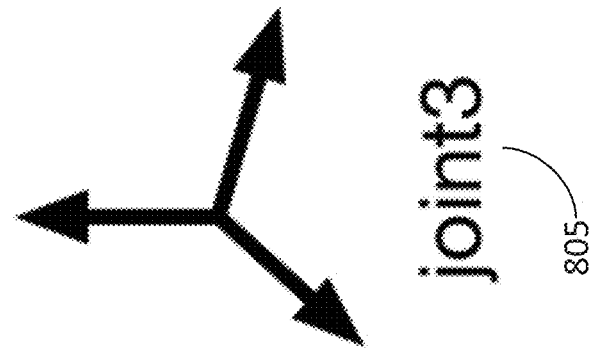
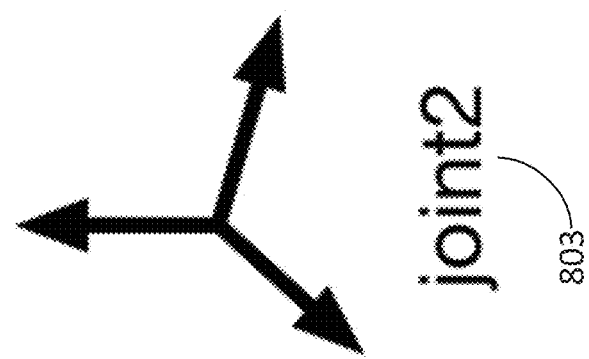
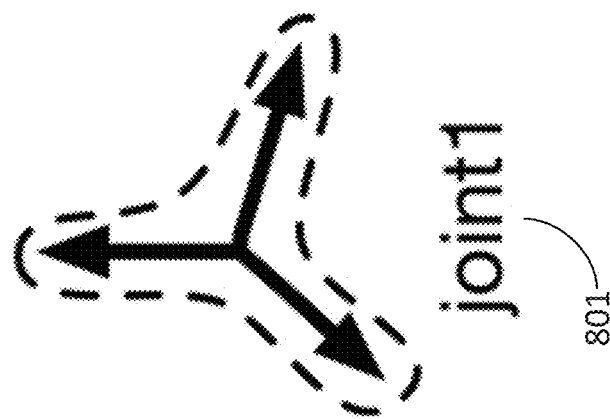
FIG. 8B

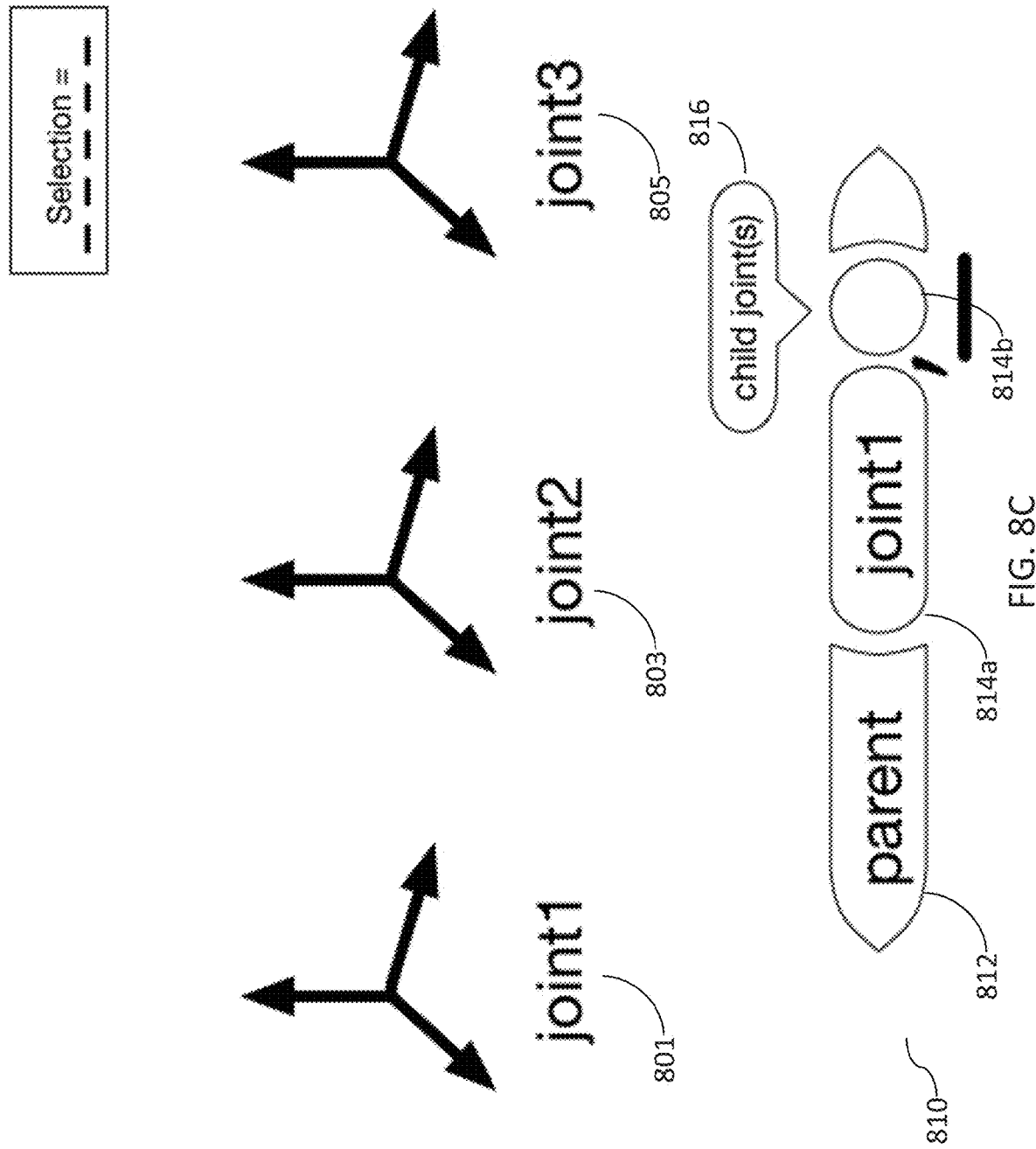

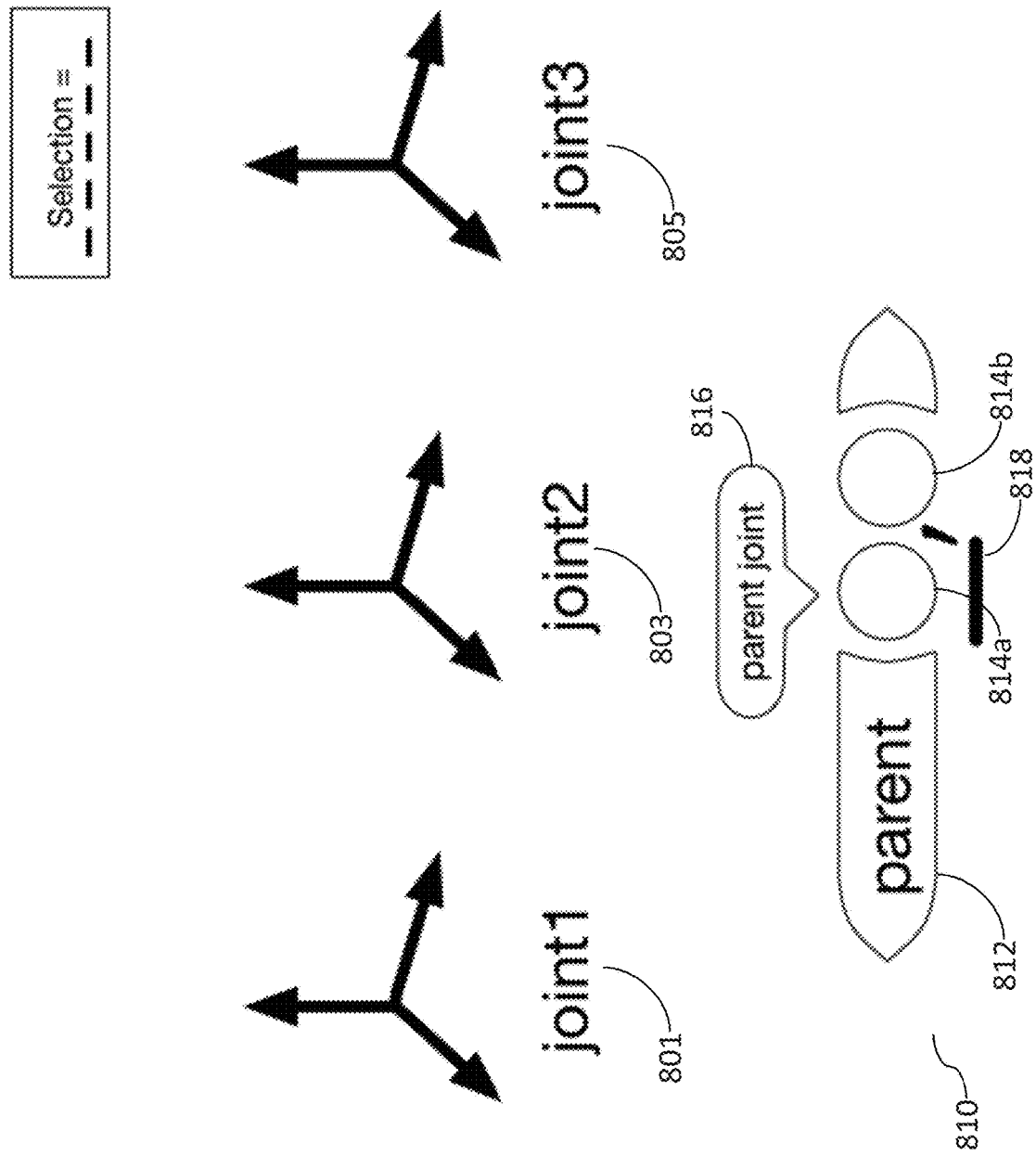

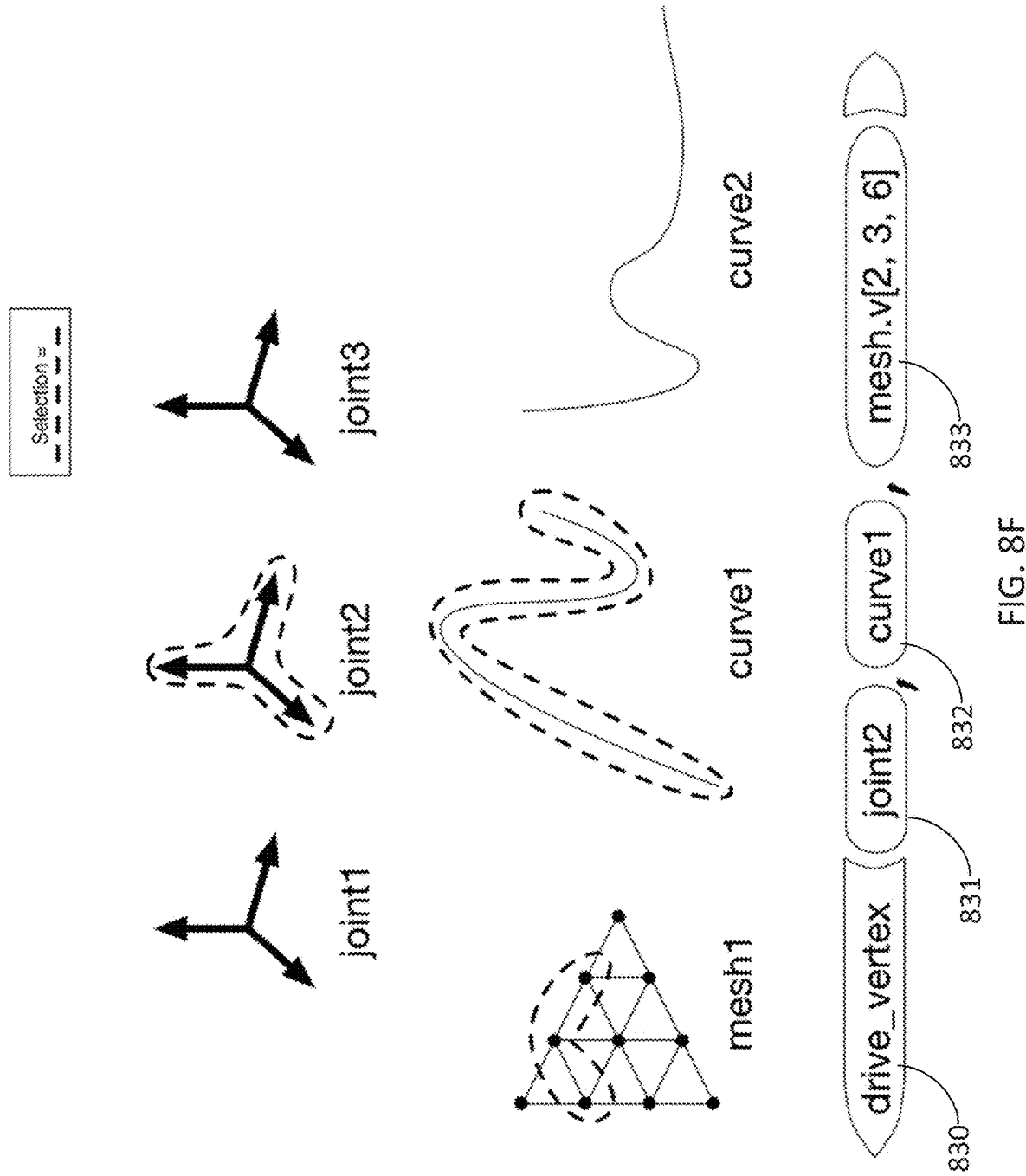

EXTENSIBLE COMMAND PATTERN

CROSS-REFERENCE TO RELATED APPLICATIONS

This application is a divisional of U.S. patent application Ser. No. 16/374,643, filed on Apr. 3, 2019, the contents of which are hereby incorporated by reference herein its entirety.

BACKGROUND

The command pattern is an existing approach to execute a series of operations for an interactive application in a general way. Each command instance will have a set of parameters that describes how it should be executed by an invoker. The invoker, while responsible for executing the commands, does not need any concrete knowledge of the specifics of each command type. For many interactive applications, the ability to undo and redo commands is paramount to the user's workflow. As such, most applications implement an invoker object that keeps track of the executed commands using a stack. This allows the invoker to undo and redo command instances in accordance with the user's workflow.

When using a command stack, it is important to guarantee the integrity of the data residing in the stack. The integrity of the stack is guaranteed by two basic requirements. Firstly, any command instance must ensure that when undone, it will restore the application data back to the state it was in before execution. Secondly, the invoker must ensure that the commands on the stack are executed, undone and redone in the exact order in which they appear on the stack. If either of these requirements are not fulfilled, commands cannot make assumptions about application data, and thus cannot guarantee that undo and redo will succeed. If it does make those assumptions and the stack is corrupted, then the behavior of the application will be undefined and may result in a crash of the application.

Another important aspect of command stack integrity is to ensure that all data modification is done through a command. Allowing data modification outside of the command pattern can also result in the corruption of the command stack.

Command patterns to date have also allowed some generality whereby each command instance is not known concretely by the invoker. However, typically each command instance has full concrete knowledge of the operations it performs internally. This limits the ability for a command instance to be extended by other modules of the application.

In some cases, execution of a first module—hereinafter "upstream" module—may result in execution of a second module—hereinafter "downstream" module. It is often necessary for the downstream module to depend on data created or edited by the upstream module. If data related to the upstream module is changed, and a downstream module depends on that data, then the downstream module needs to be updated as well in response to the data change. In some cases however, the upstream module has no information about the subsequent downstream module, and thus cannot directly modify the data of the downstream module.

Some approaches have attempted to address these issues, but these techniques are not without their own drawbacks. For example, notifications may be used to inform other modules in the application of changes to data. Some approaches to command extensibility have involved executing another command in response to a notification. However, the notifications approach does not provide any control or information about the ordering of downstream modules which are acting in response to the notifications. This may be particularly problematic if two downstream modules have inter-dependencies, or additional levels of dependencies with their own downstream modules. Additionally, a notifications-based approach may present issues when a notification is generated from an undo or redo command, since the downstream modules are already on the command stack and will be undone or redone explicitly as a part of the undo or redo command.

Thus, the existing systems and methods are unable to provide a command stack solution providing an effective combination of extensibility and control over the internal ordering of a command's execute, undo and redo methods. Therefore, it may be advantageous to provide an extensible command pattern using directed acyclic graphs which provides effective extensibility and control over the internal ordering of a command's execute, undo and redo methods.

SUMMARY

Embodiments of the present disclosure include systems, methods, and computer-readable media for command stack management and implementation using directed acyclic graphs.

Embodiments of the present disclosure include implementation of directed acyclic graphs to define dependencies between downstream and upstream modules of a command stack, as well as interdependencies between modules and multiple nesting of dependencies. In embodiments of the present disclosure, a command type can choose to be an upstream command allowing the registration of other commands to be downstream of it. By chaining together dependencies of multiple command types, a directed acyclic graph, or DAG is constructed. The upstream command is able to control exactly in which order the downstream commands are executed, and it may choose to call the downstream commands before execution of its own modifications, after execution of its own modifications, or a mixture of both orderings. The upstream commands can pass information that is used as execution parameters for the downstream commands. Not only can the upstream command control the ordering of the execution of downstream commands, but also the ordering of undo and redo operations as well.

An embodiment of a machine-readable non-transitory medium of the present disclosure includes machine-readable non-transitory medium having stored thereon machine-executable instructions for implementing a command stack for an application, the instructions comprising receiving an input for executing a first command of the application, initiating execution of the first command, executing one or more second commands which are set to execute based on execution of the first command, completing execution of the first command, and including the first command in the command stack such that an association is defined between the first command and the one or more second commands.

An embodiment of a system of the present disclosure for generating an animation rig comprises an input interface configured to receive inputs, and one or more processors configured to receive an input via the input interface for executing a first command of the application, initiate execution of the first command, execute one or more second commands which are set to execute based on execution of the first command, complete execution of the first command, and include the first command in the command stack such that an association is defined between the first command and the one or more second commands.

An embodiment of a system of the present disclosure for generating an animation rig includes means for receiving an input for executing a first command of the application, initiating execution of the first command, executing one or more second commands which are set to execute based on execution of the first command, completing execution of the first command, and including the first command in the command stack such that an association is defined between the first command and the one or more second commands.

BRIEF DESCRIPTION OF THE DRAWINGS

The above and other aspects and features of the present disclosure will become more apparent upon consideration of the following description of embodiments, taken in conjunction with the accompanying drawing figures.

FIGS. 1A, 1B, 1C, 1D, and 1E are illustrations of a command stack according to existing implementations.

FIGS. 5A, 5B, 5C, 5D, 5E, 5F, 5G, 5H, 5I, 5J, 5K, 5L, and 5M are illustrations of implementing a command stack according to embodiments of the present disclosure.

FIG. 7 is a flowchart illustration of a method according to one embodiment of the present disclosure.

FIGS. 8A, 8B, 8C, 8D, 8E, and 8F are illustrations of a dynamic workflow for executing a command according to an embodiment of the present disclosure.

DETAILED DESCRIPTION

Figure 1A:
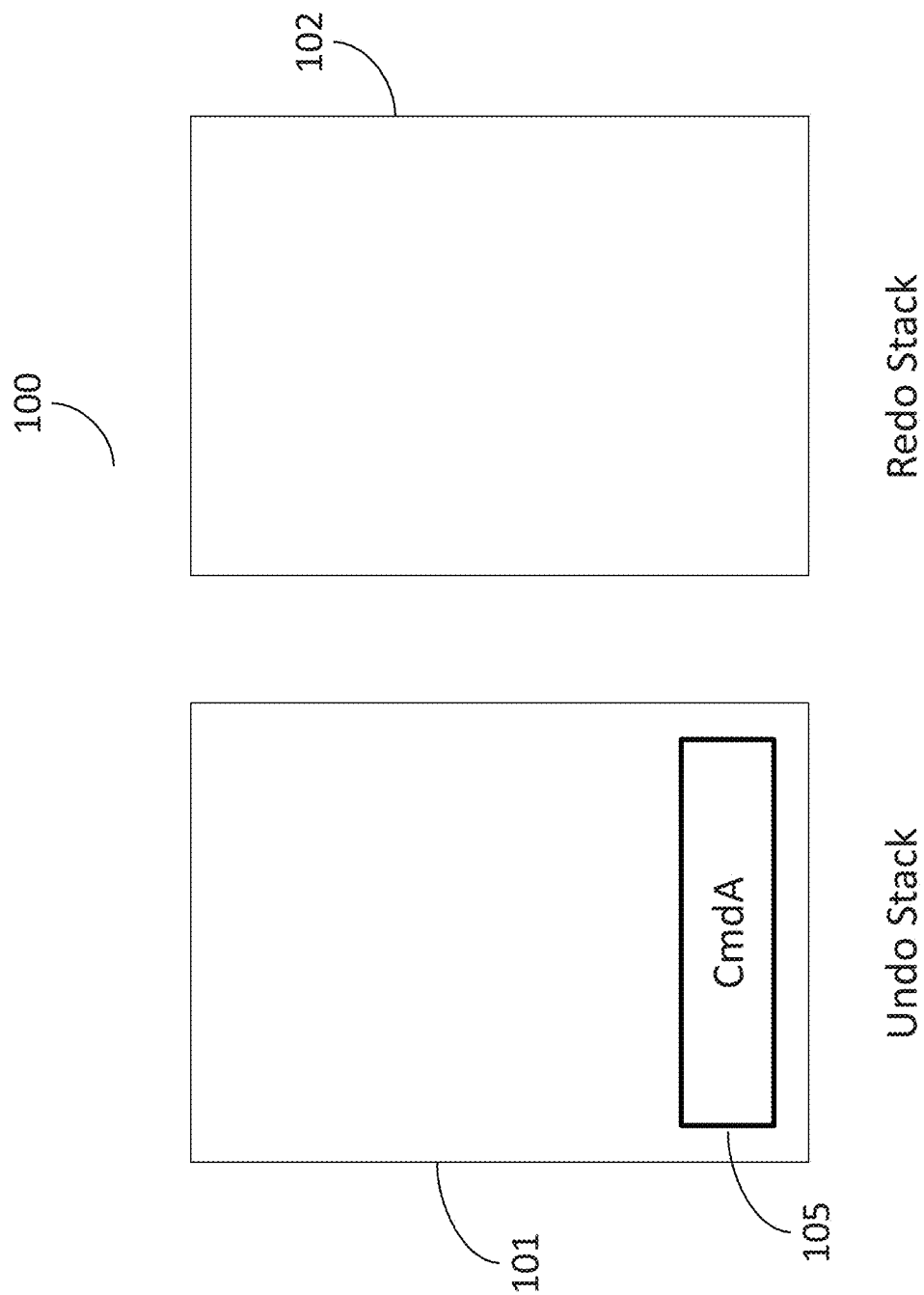

In the following detailed description, reference is made to the accompanying drawing figures which form a part hereof, and which show by way of illustration specific embodiments of the present invention. It is to be understood by those of ordinary skill in this technological field that other embodiments may be utilized, and that structural, electrical, as well as procedural changes may be made without departing from the scope of the present invention. Wherever possible, the same reference numbers will be used throughout the drawings to refer to the same or similar parts.

While some parts of this disclosure is presented in the context of 3D animation applications, it is not limited thereto, and other implementations of the systems, media, and methods described herein are contemplated, including general use applications and applications used for various industries and purposes, including document editing, business data workflow, photo and/or video editing, generation of rigs for characters or objects within a 2D or 3D coordinate system, as well as for various interactive geometric modeling applications involving production and modification of geometric models, including, but not limited to, rigging, animation, architecture, automotive design, consumer product design, virtual reality applications, augmented reality applications, game development, visual effects, 3D printing, and the like, including applications outside of the animation industry to other industries that rely on scripting and visual programming. Any reference in this disclosure to a geometric model or components thereof, within a 3D model or 3D space will be understood to include the disclosure as applicable to 2D models and 2D spaces.

In this disclosure, the term "character," "object," or "model" may include any suitable computer representation or geometric model of part or all of an entity, such as a character, a landscape, an inanimate object, or any other virtual, modeled, and/or animated entity. Objects may be constructed, for example, out of geometrical vertices, edges, and/or faces in a 2D or 3D coordinate system. A "point," "vertex," "edge," or "component" may include one of a set of elements used to determine the shape, movement, appearance, and/or absolute or relative positioning of a 3D model, including but not limited to vertices, points, edges, and faces of a 2D or 3D model. Any description of the present disclosure with respect to one of a point, a vertex, an edge, or a face will be understood to apply equally and/or analogously to the others of a point, a vertex, an edge, or a face where applicable, as will be understood by one of ordinary skill in the art, and use of one term over another within this disclosure will not be deemed to be limiting to only the term being used.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable processors.

Referring now to FIG. 1 and its various sub-figures, a simplified example of a command stack maintained by an invoker in a command pattern is shown. It will be understood by those of ordinary skill that a command pattern refers to a behavioral design pattern in which an object is used to encapsulate all information needed to perform an action or trigger an event. The encapsulated information includes the method name, the object that owns the method, and values for the method parameters. A request is thus wrapped under an object as command and passed to invoker object. The invoker object looks for the appropriate object which can handle this command and passes the command to the corresponding object which executes the command. For the purposes of this discussion, the general system for handling execution and ordering of commands will be referred to as the command system.

In order to track the commands and the order in which they have been executed, or in order to enable undo and redo of commands, the invoker object may keep track of the executed commands using a stack. As discussed, it is important that the integrity of the stack is maintained in order to ensure correct data modifications, including undo and redo of commands.

Figure 1B:
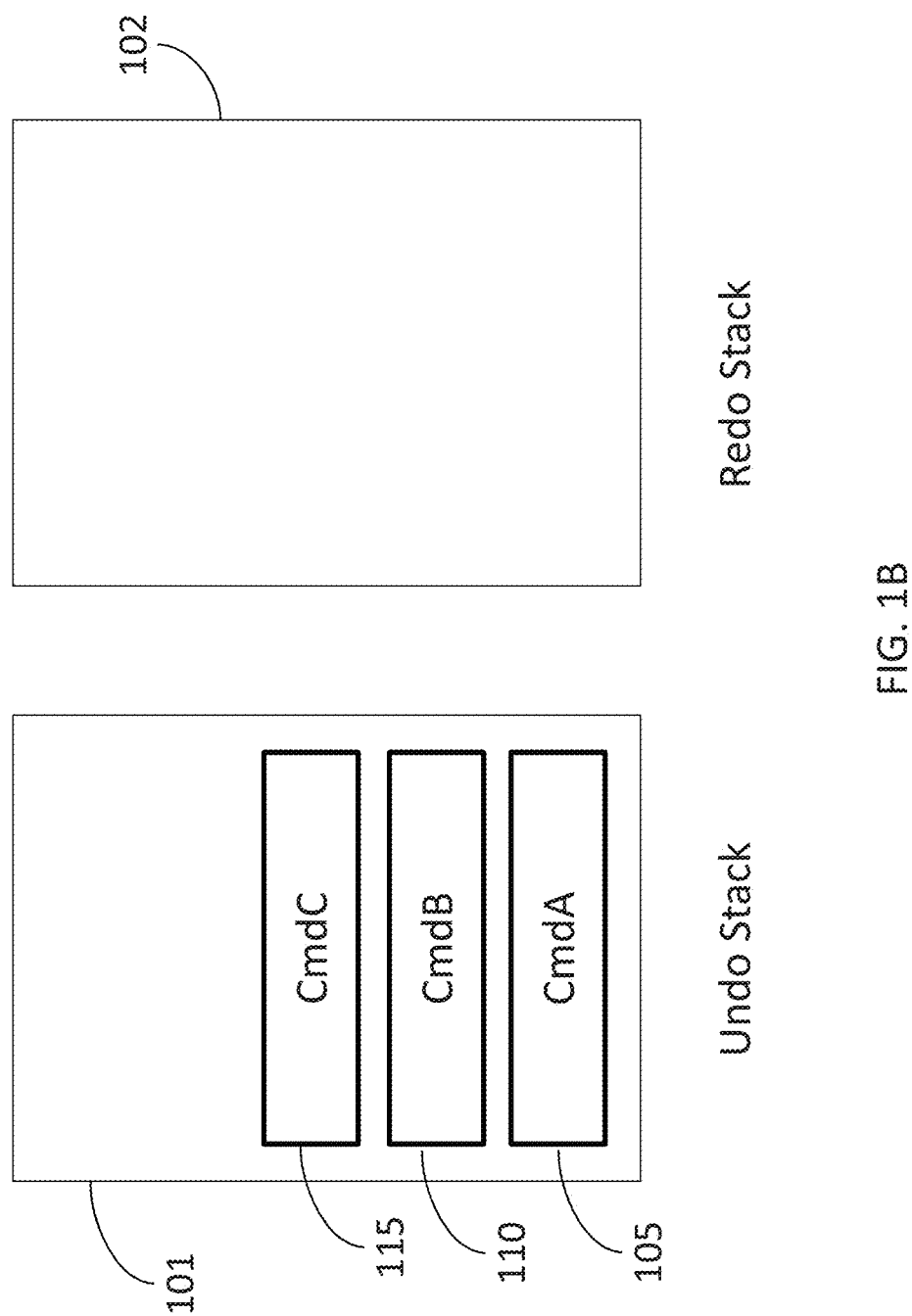

FIG. 1A shows the command stack 100 as two separate stacks, an undo stack 101 and a redo stack 102. The state shown in FIG. 1A corresponds to one in which a single command, CmdA 105, has been executed, and thereafter added to the undo stack 101. FIG. 1B shows a state in which a second command, CmdB 110, has been executed after the execution of CmdA 105, and a third command, CmdC 115, has been executed after the execution of CmdB 110. According, CmdB 110 and CmdC 115 are added to the undo stack 101 in the order in which they were executed, as shown in FIG. 1B.

It is noted that in the implemented command pattern, the commands have no information related to the other executed commands. CmdA 105 is provided with no information of the execution or data that is edited by the execution of CmdB 110 or CmdC 115. This is the case even where the execution of CmdB 110 or CmdC 115 is a direct result of the execution of CmdA 105, where CmdA 105 is considered an upstream command of CmdB 110 or CmdC 115. Thus, CmdA 105, even where it is executed before CmdB 110 or CmdC 115, is unable to pass any information to downstream commands CmdB 110 or CmdC 115 for use in executing its commands.

Similarly, if any data is edited with respect to the data generated or edited by CmdA 105, CmdA 105 has no capability of calling any editing or updating functions of CmdB 110 or CmdC 115 to be performed in response to the editing of the CmdA 105 data. Notification approaches have addressed this by implementing event listeners which execute update functions of CmdB 110 or CmdC 115 in response to a notification of the data edit to the CmdA 105 data, however this places all updating responsibilities to CmdB 110 or CmdC 115, and also does not provide upstream CmdA 105 with any control as to the ordering or the data that is used to perform the updating.

Figure 1C:
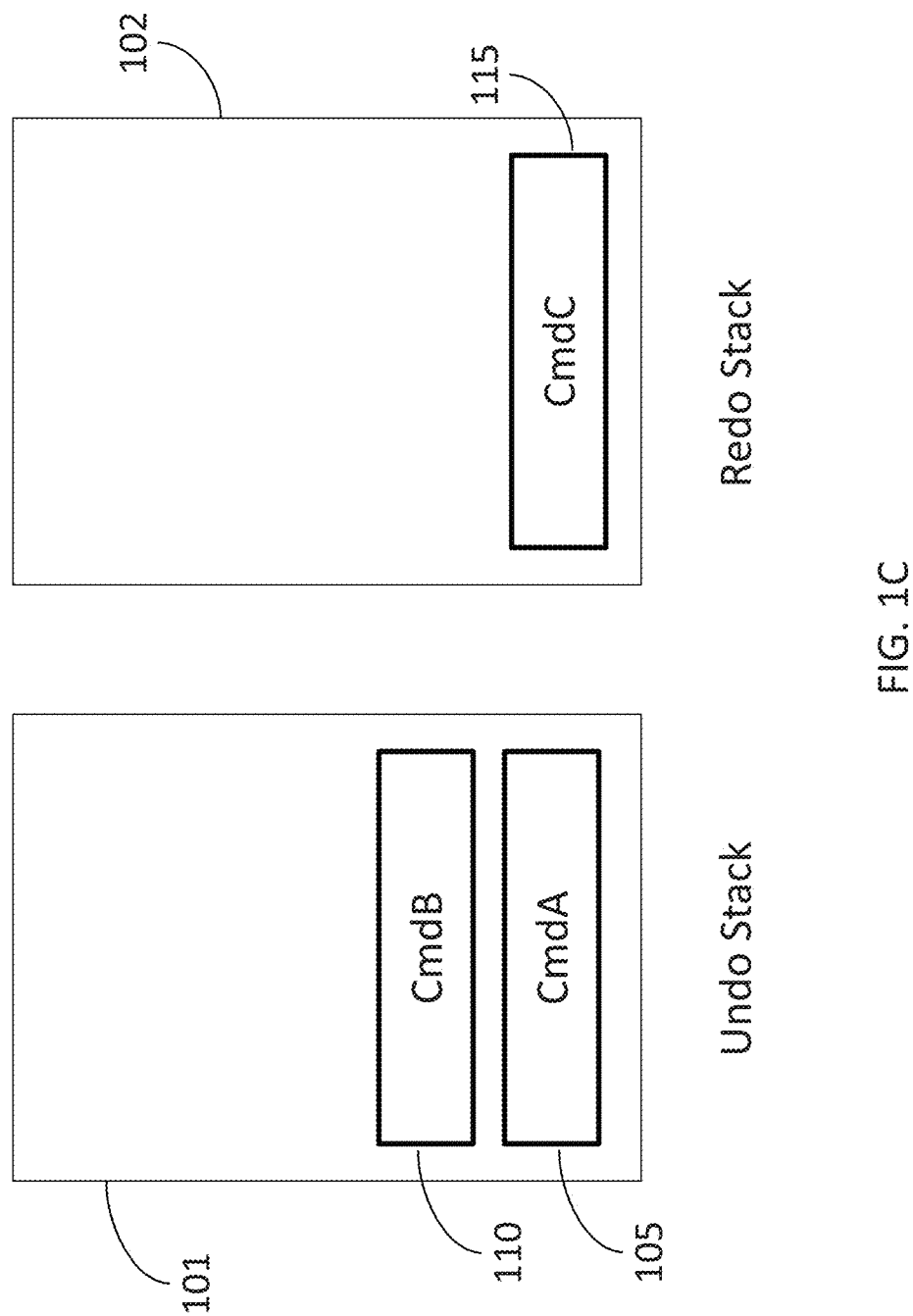

FIG. 1C now shows a state in which an undo operation has been performed from the state of FIG. 1B. Thus, the most recently executed command, CmdC 115, has been popped from the undo stack 101, any data changes resulting from CmdC 115 have been restored to their previous state prior to executing CmdC 115, and thereafter CmdC 115 has been added to the redo stack 102 in the event of a redo input. If a redo input is received, CmdC 115 may be popped from the redo stack 102, executed again, and then pushed back to the undo stack 101 as the most recently executed command.

In some embodiments, redo of a command may include executing the command as it would normally be executed. In some other embodiments, data or state information from the previous execution of the command may be stored or maintained in memory when the command is added to the redo stack 102, and the stored data or state information may be utilized during the redo operation to return the previous state prior to undo of the command.

Figure 1D:
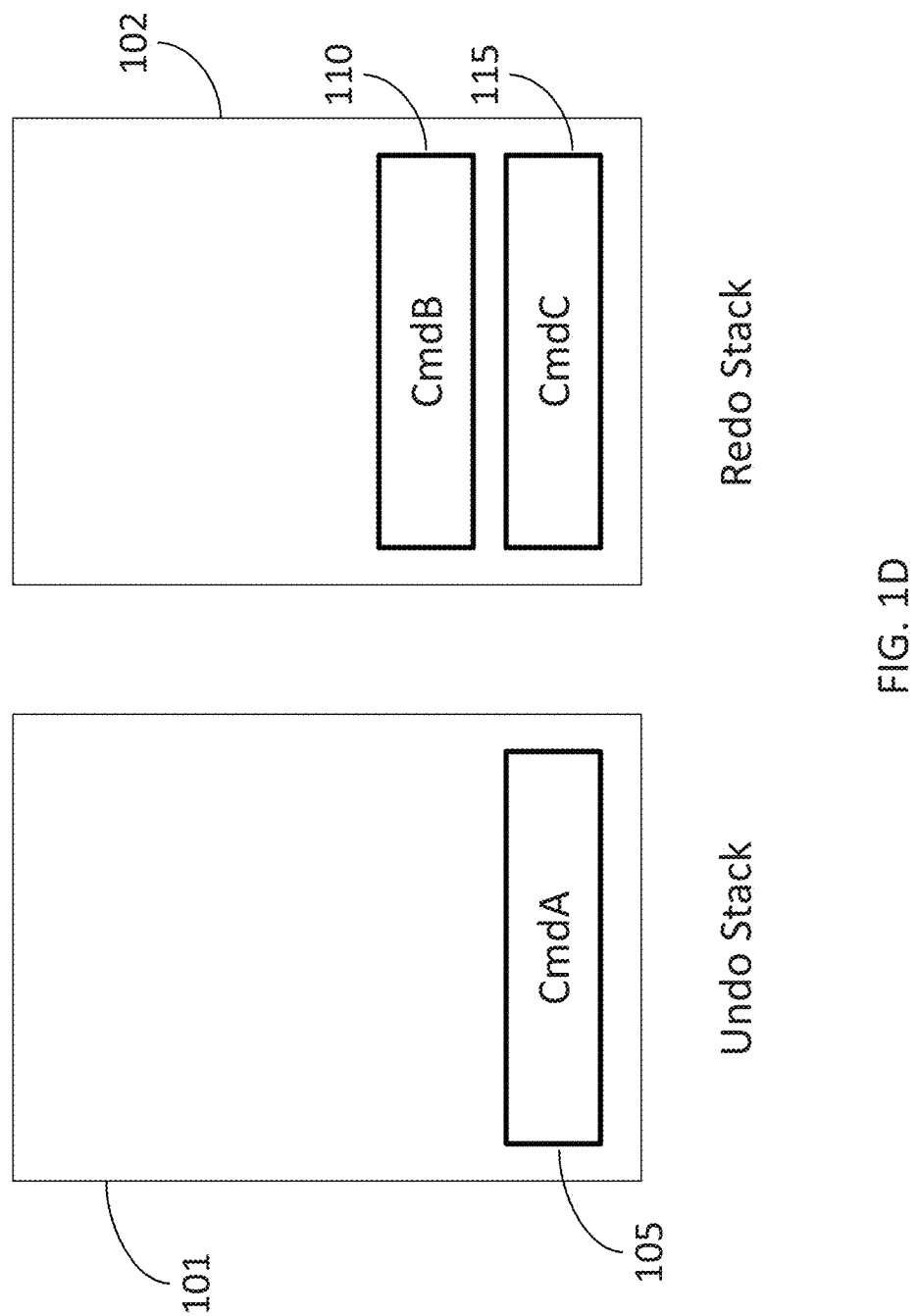

FIG. 1D shows a state in which undo operation is performed again from FIG. 1C, resulting in CmdB 110 being removed from the undo stack 101 and added to the redo stack 102 after any data changes from executing CmdB 110 are restored.

FIG. 1E, shows a state in which a new command, CmdD 120 has been executed following the state shown in FIG. 1D. As discussed, CmdD 120 has been added to the undo stack 101 as the most recently executed application, however the redo stack 102 has also been cleared and CmdB 110 and CmdC 115 have been removed from the redo stack 102. The clearing of the redo stack 102 is required to maintain the correct ordering of command operations and to ensure that performing a redo operation produces the expected state.

Specifically, since CmdD 120 has not been executed within the ordering of the previously executed commands CmdA 105, CmdB 110, and CmdC 115, re-executing CmdC 115 (after executing CmdD) upon a redo input would result in data changes from CmdC 115 being executed on top of any data changes already performed by new command CmdD 120. Thus, re-executing CmdC 115 would result in a state that is not the same as the state that existed after the first execution of CmdC 115 (shown in FIG. 1B), and therefore the redo stack 102 must be cleared when a new command, CmdD 120, is executed.

In some implementations, two separate stacks 101, 102 are used as shown in FIGS. 1A-1F and commands are added to the undo stack 101 as they are executed, removed from the undo stack 101 for undo operations and added to the redo stack 102, and so on, as discussed above. However, it will be understood that in other implementations, a single command stack may be used along with a pointer to indicate a current state position within the stack.

Figure 2:
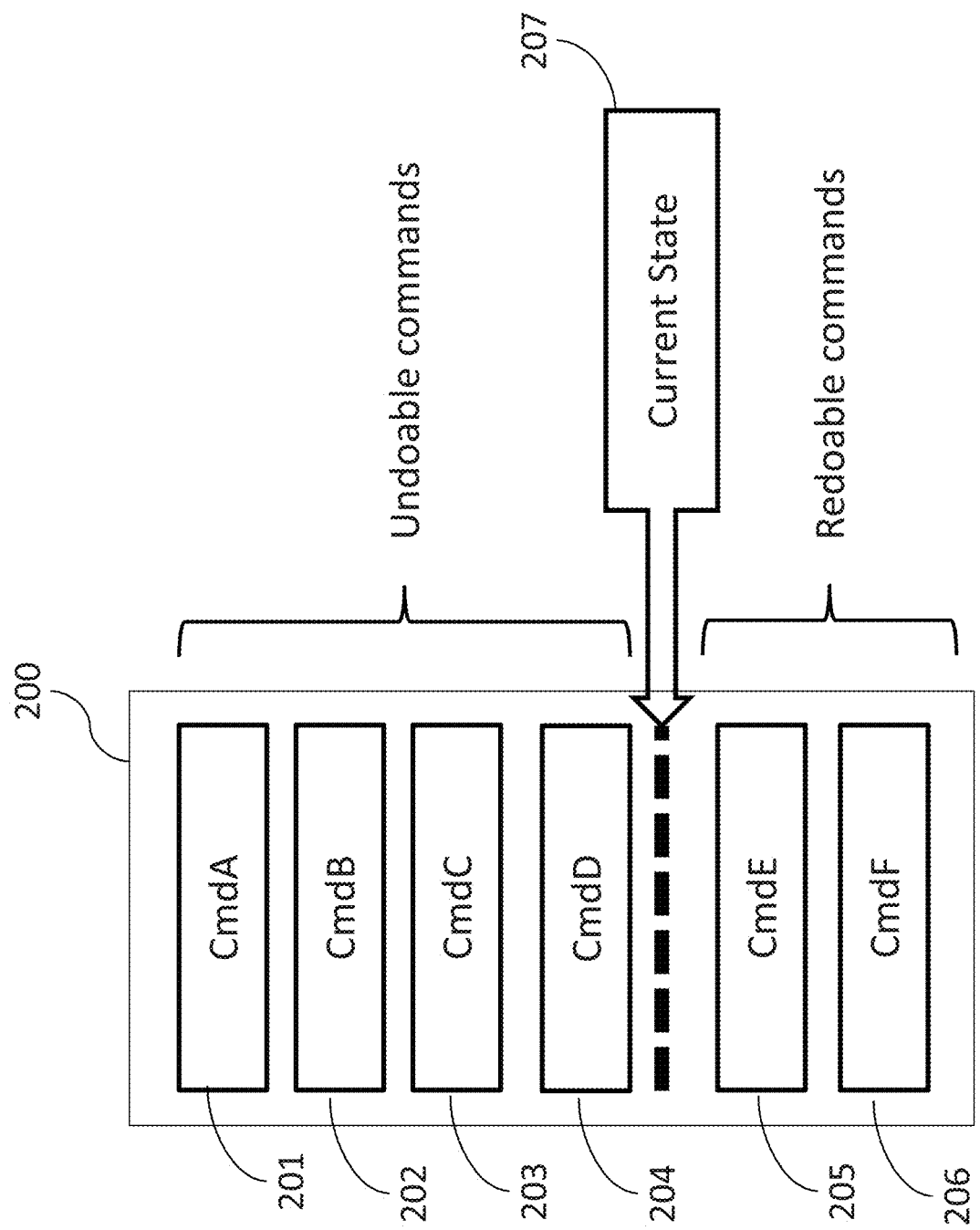
FIG. 2 is another illustration of a command stack according to existing implementations.

For example, FIG. 2 shows a single command stack 200 with command objects 201-206 which have been pushed to the stack 200 in the order in which they were executed. A pointer 207 may be used to indicate a position within the stack 200 corresponding to a current state of the application.

Command objects positioned on either side of the current state may represent the commands to be undone (201-204) or redone (205-206) based on the received input, with the pointer 207 updated for each operation. Similar to FIG. 1E, the command objects located on the redo side of the pointer 207 may be cleared upon execution of a new command.

As discussed above, the command stack may provide a reliable technique of tracking execution and ordering of commands. However, issues may arise when complexities are introduced, for example when execution of a first upstream command results in execution of a second downstream command, not as result of a user generated execution of the second command, but by the nature of the first and second commands. It is often necessary for the downstream command to depend on data created or edited by the upstream command. If data related to the upstream module is changed, and a downstream module depends on that data, then the downstream module needs to be updated as well in response to the data change. In some cases however, the upstream module has no information about the subsequent downstream module, and thus cannot directly modify the data of the downstream module.

For example, in the animated character rigging process, if a first upstream command is for creation of a joint of the rig, upon creation of the joint a second command for generating annotations related to the created joint may be automatically executed without additional input from the user.

A notifications approach may not provide any control or information about the ordering of downstream modules which are acting in response to the notifications. To extend the above example of a first command creating a joint and a second downstream command to create annotations for the joint, if a command is executed to delete the joint, a notification may be sent out to all modules that the joint has been deleted. Upon receiving the notification, the annotation module may recognize that it also needs to delete the associated annotations. However, at that point, the joint has already been deleted, thus introducing potential errors in executing deletion of annotations.

A workaround solution may be to send the notification after initiating the "delete joint" command—but just before the joint is actually deleted—in order to allow downstream modules to act upon the data which is dependent on the joint prior to deletion. If an "undo instruction" is then received, the joint will be created again, which results in a notification for the annotation to be created. However, as the "undo instruction" is processed, the "delete annotation" command from the command stack is then undone, which would create another annotation separately from the newly issued "create annotation" command. As a result, the listener must ignore some notifications over others if they are the result of an "undo instruction" in order to avoid redundant execution, which may lead to inelegant and overly-complex implementations.

It is also possible for multiple commands to be executed as a result of executing a single upstream command, and further, the downstream commands may result in execution of additional downstream commands of their own. This may be particularly problematic if two downstream modules have inter-dependencies, or additional levels of dependencies with their own downstream modules. The notifications-based approach may also present issues when a notification is generated from an undo or redo command, since the downstream modules are already on the command stack and will be undone or redone explicitly as a part of the undo or redo command.

For example, referring to FIG. 1B, command CmdB 110 may be a downstream command which is executed in response to execution of CmdA 105. Similarly, CmdC may be a downstream command which is executed in response to execution of CmdB. However, these two layers of dependencies are not reflected in the command stack 100. Thus, in a notifications-based approach, undoing or changing the data of CmdA 105 may result in undoing or changing the data of CmdB 110 and CmdC 115 in an incorrect order since the command stack has no information regarding the multi-layer dependencies of the commands.

Embodiments of the present disclosure include implementation of directed acyclic graphs to define dependencies between downstream and upstream modules, as well as interdependencies between modules, as well as multiple nesting of dependencies. In embodiments of the present disclosure, a command type can choose to be an upstream command allowing the registration of other commands to be downstream of it. In some embodiments, registration of commands to be downstream or upstream from each other may be accomplished by defined functions at the class, superclass, or object level, with particular defined parameters which allow a command to call upon a method of another command to register itself to be associated with it, either as an upstream or downstream command.

By chaining together dependencies of multiple command types, a directed acyclic graph, or DAG is constructed. The upstream command is able to control exactly in which order the downstream commands are executed, and it may choose to call the downstream commands before execution of its own modifications, after execution of its own modifications, or a mixture of both orderings. The upstream commands can pass information that is used as execution parameters for the downstream commands. Not only can the upstream command control the ordering of the execution of downstream commands, but also the ordering of undo and redo operations as well.

While the notification technique uses only a linear one-dimensional command stack, owned by the invoker, a command DAG according to embodiments of the present disclosure may utilize a different approach in order to give the upstream command full control over ordering of any downstream commands. Thus, in embodiments of the present disclosure, each upstream command instance manages its own internal stack of downstream commands. The invoker continues to own a top level stack as the main entry point to command invocation, however downstream command invocation is not added directly to this stack, but added to the internal stack of each corresponding upstream command.

By giving the upstream command control over ordering, we can solve all of the ordering issues encountered in the notification technique. This allows us to achieve both command extensibility while ensuring the integrity of our command stack, and providing the user with a reliable undo and redo workflow.

Figure 3:
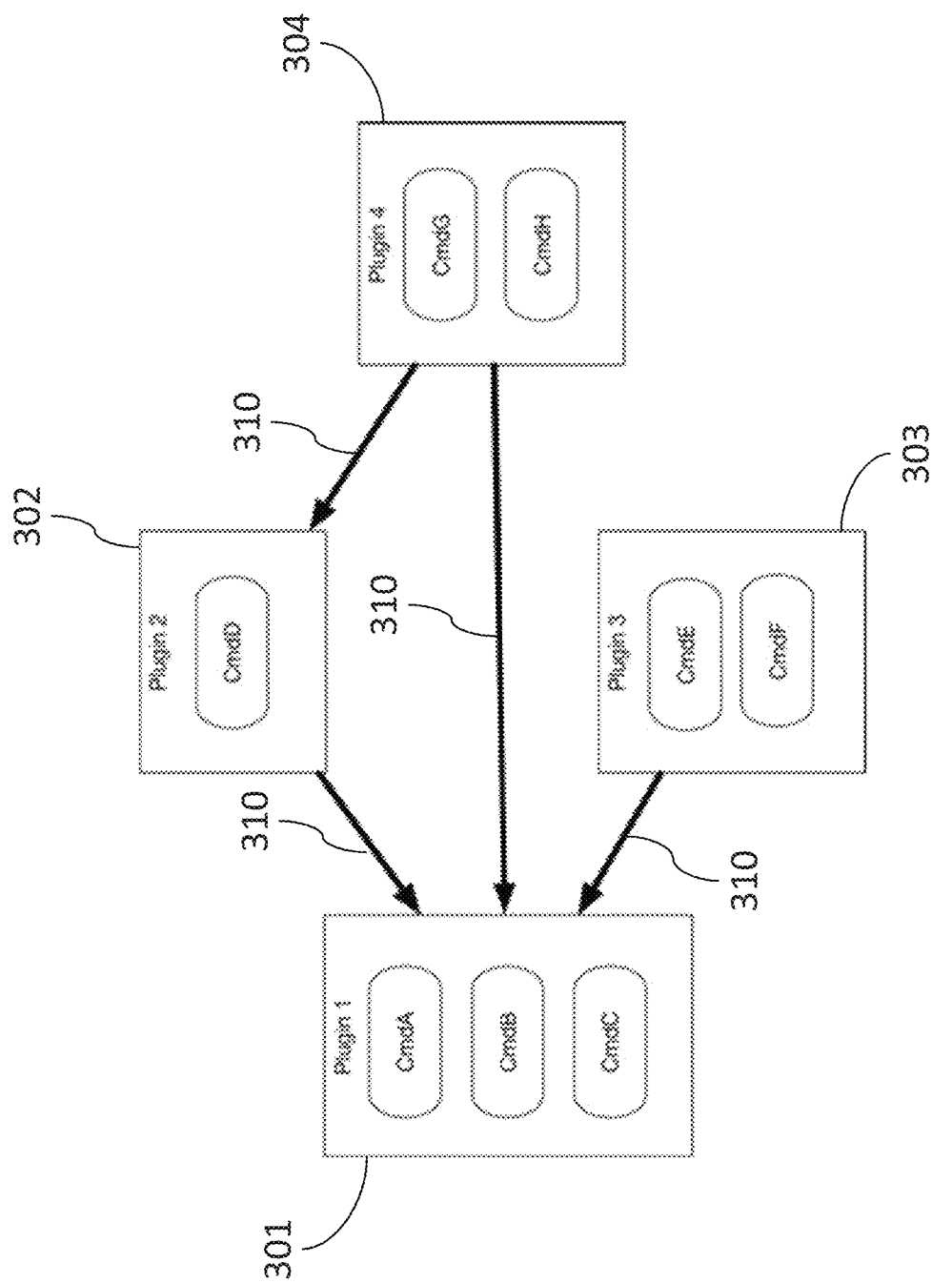
FIG. 3 is a diagram of a plugin directed acyclic graph according to an embodiment of the present disclosure.

Embodiments of the present disclosure will now be discussed with reference to FIGS. 3 and 4. FIG. 3 shows an embodiment of the present disclosure with four plugins 301-304, referred to also as modules, of an application which include their own command definitions. A plugin refers to a modular software component that can extend the functionality of the application. Each plugin can depend on other plugins, or each plugin may be independent and not have any dependencies. The plugin dependencies, indicated by the one-way arrows 310 of FIG. 3, form a directed acyclic graph (DAG) for the plug-ins of the particular application.

The plugin DAG describes dependencies between software modules of a particular application, and specifically how one software module may depend on another software module. These dependencies may exist to ensure availability of shared objects in the memory, for example where one module needs to link in a library which is available after loading another upstream module. In another example, a module may depend on another upstream module in order to expand upon the functionality of the upstream module once it is loaded. However, it will be understood that the dependencies between plugins are independent from dependencies between commands within the plugins.

Separate from the plugin DAG, embodiments of the present disclosure include construction of Command DAGs to define associations and dependencies between commands. In some cases, the command dependencies of a Command DAG may mirror the dependencies of their corresponding plugins in the Plugin DAG, but this is not always the case. Command dependencies may cross the lines of module dependencies, where a first command A is dependent on an upstream command B, while the plugin PA corresponding to the first command A is not dependent on plugin PB corresponding to the upstream command B, but instead is dependent on a third plugin PC.

In some embodiments of the present disclosure, the Plugin DAG may be constructed and stored in memory during loading and initialization of the plugins. The dependencies between the plugins may be predefined according to the application configuration, or they may be determined in real time based on various factors. In some cases, the plugin dependencies may be based on factors such as shared resource availability, extensibility of plugins by other dependent plugins, the order of loading and instantiation, or in some cases the dependencies may be determined arbitrarily.

In some embodiments of the present disclosure, the Command DAG may be constructed and stored in memory during loading and initialization of the commands. As discussed further below, the dependencies between the commands may be based on factors such as order of initialization, type of operations performed by each command, amount of data generated or modified by each command, amount of resources required for each command, and the like, or in some cases the dependencies may be determined arbitrarily. The constructed Command DAG may be used to determine downstream and upstream dependencies between commands when implementing the extensible command pattern as discussed further in this disclosure.

Plugins can define as many commands as required. During initialization of the plugins, a first command of a plugin can register itself with another second command to define a dependency from the first command to the second command. In some cases, registration of downstream commands may be independent from initialization of the corresponding plugins. For example, the first command may register itself with the second command at any time after initialization of its corresponding plugin is started, where the first command may register itself with the second command during the initialization of its corresponding plugin or after completion of the initialization of its corresponding plugin.

Figure 4A:
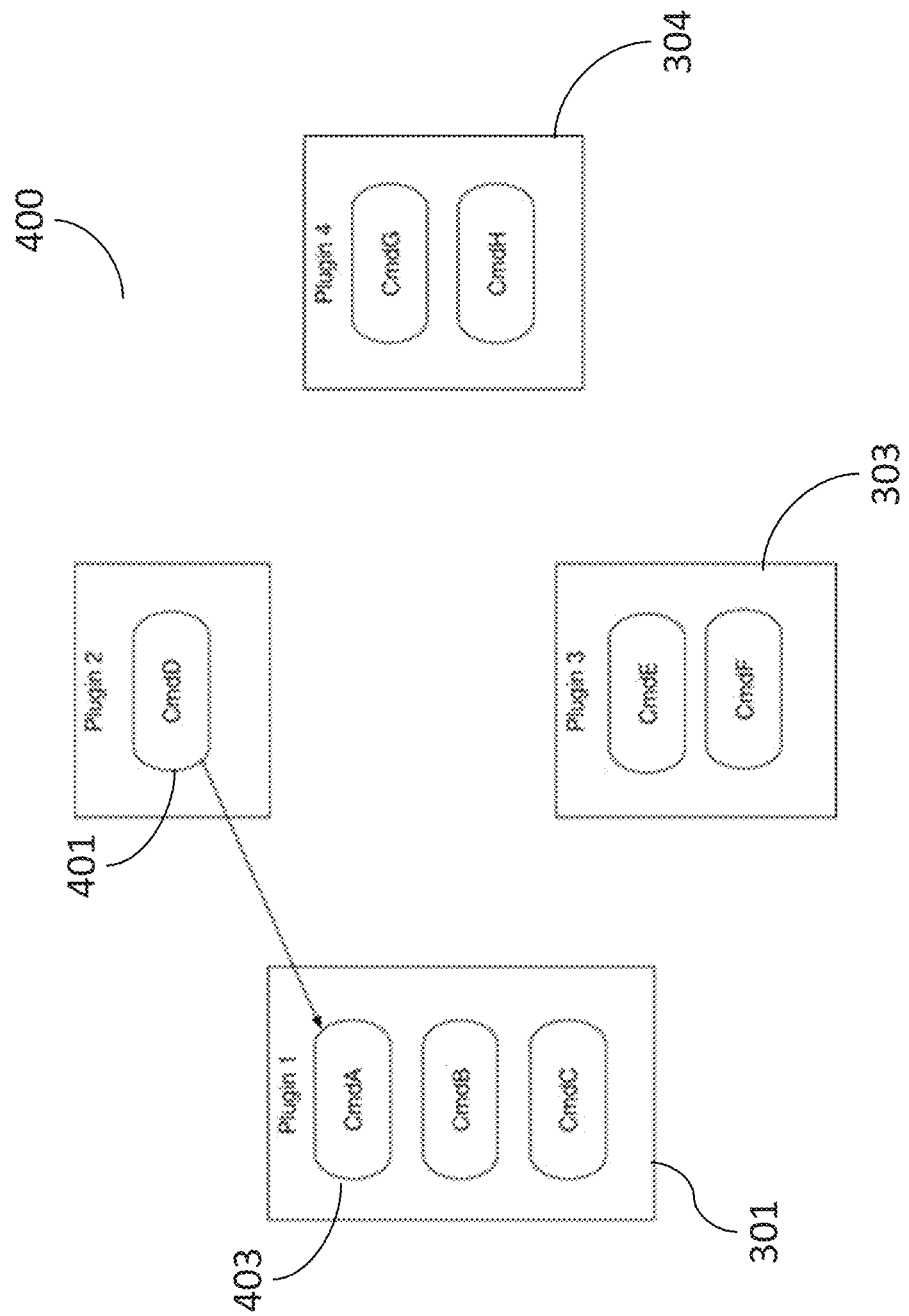
FIGS. 4A, 4B, 4C, 4D, and 4E are illustrations of a command directed acyclic graph according to embodiments of the present disclosure.

Referring to FIG. 4A, during initialization of Plugin 2 302, CmdD 401 may be registered as a downstream command of CmdA 403, as indicated by the one-way arrow from CmdD 401 to CmdA 403. In some embodiments, this registration of a command as being dependent on another command may be performed using a method defined at the target command instance so that the upstream command maintains information regarding all of its registered downstream commands. As these registrations occur, a Command DAG 400 may be constructed.

Figure 4B:
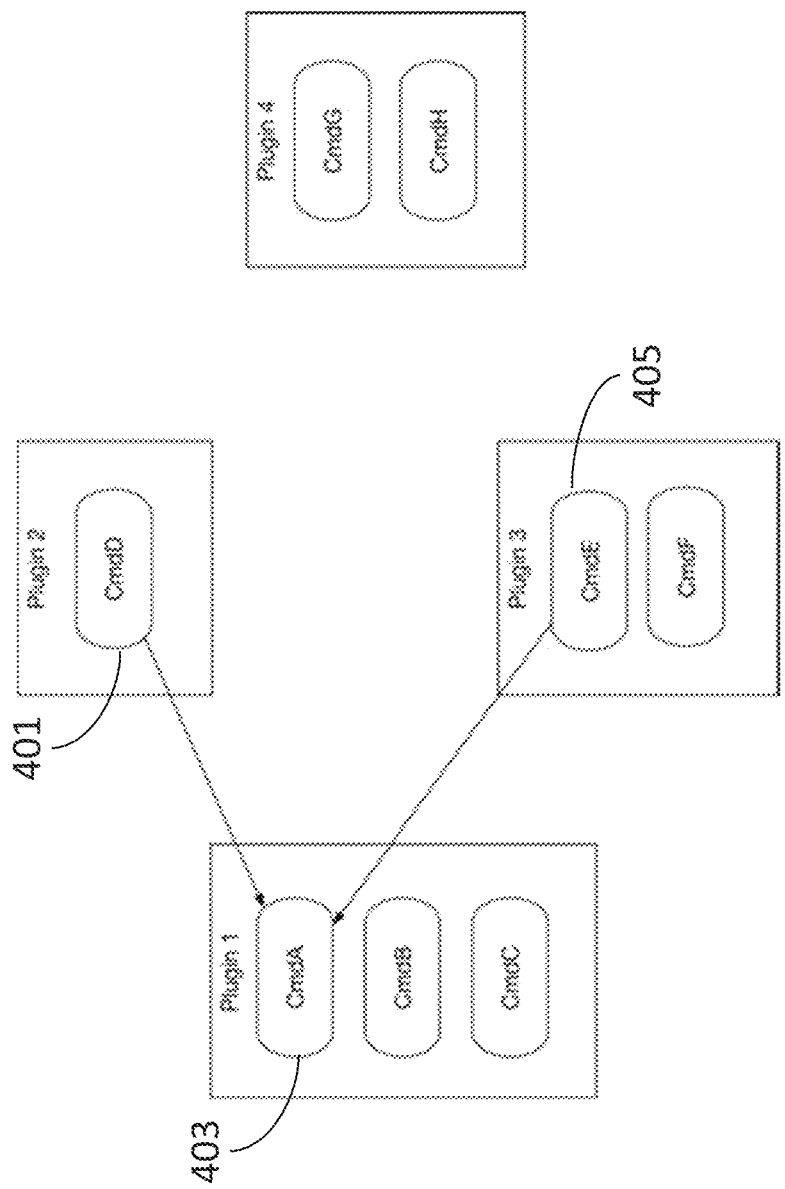
Figure 4C:
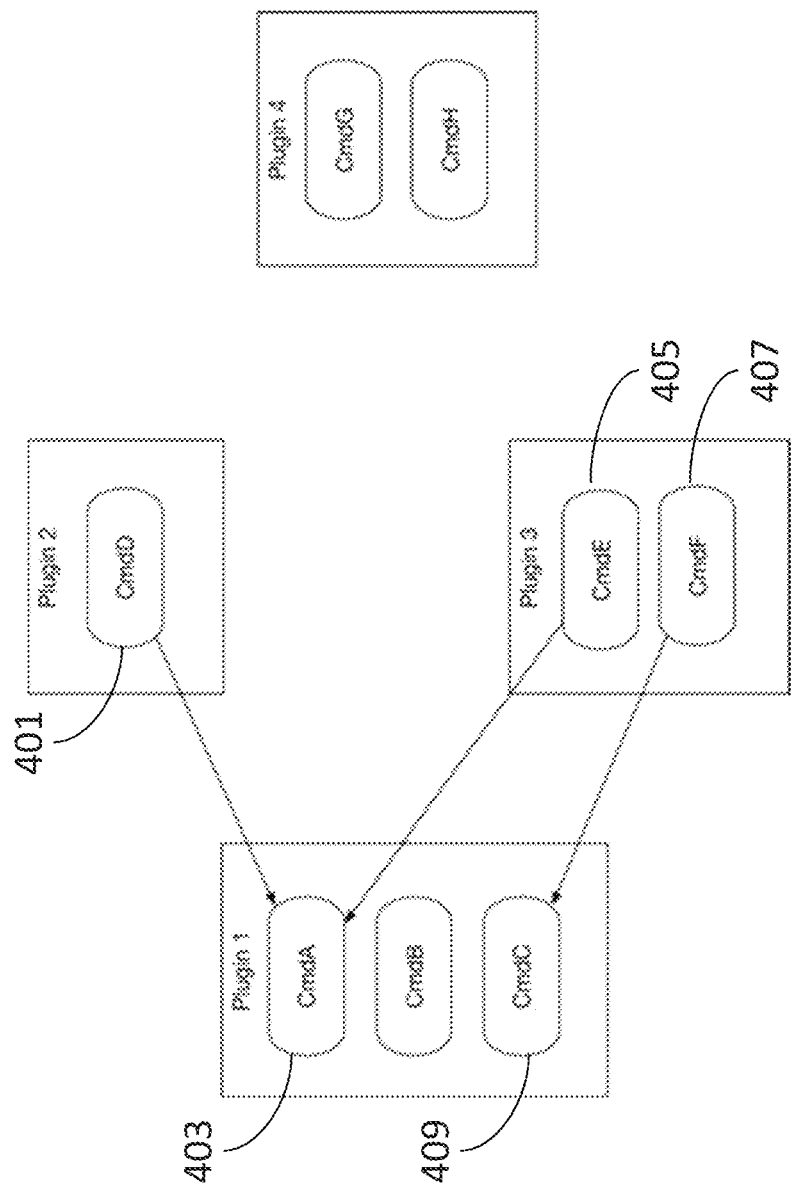

After Plugin 2 302 has initialized, Plugin 3 303 is initialized. FIG. 4B shows CmdE 405 has been registered downstream of CmdA 403 also. FIG. 4C shows that CmdF 407 has been registered downstream of CmdC 409. This example illustrates that not all commands are required to participate in all DAGs. In some embodiments, it may also be common to have many distinct Command DAGs in a single application.

Figure 4D:
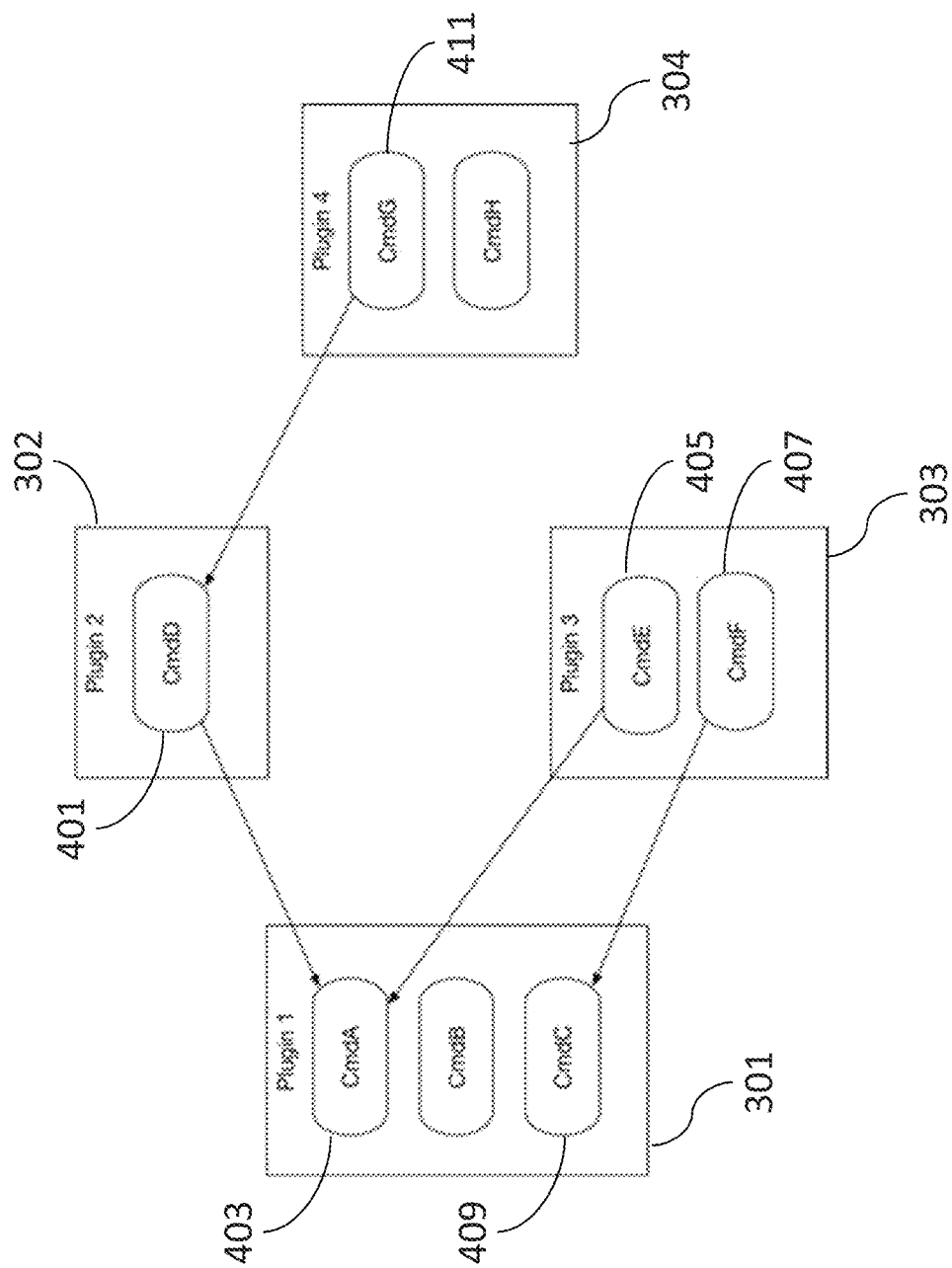

FIG. 4D shows that Plugin 4 304 is initialized after Plugin 3 303, and CmdG 411 is registered to be a downstream command of CmdD 401. As shown in FIG. 4D, in some cases dependencies of commands may have several layers wherein a downstream command, e.g., CmdD 401 downstream from CmdA 403, may have its own registered downstream commands, e.g., CmdG 411 downstream from CmdD 401.

Figure 4E:
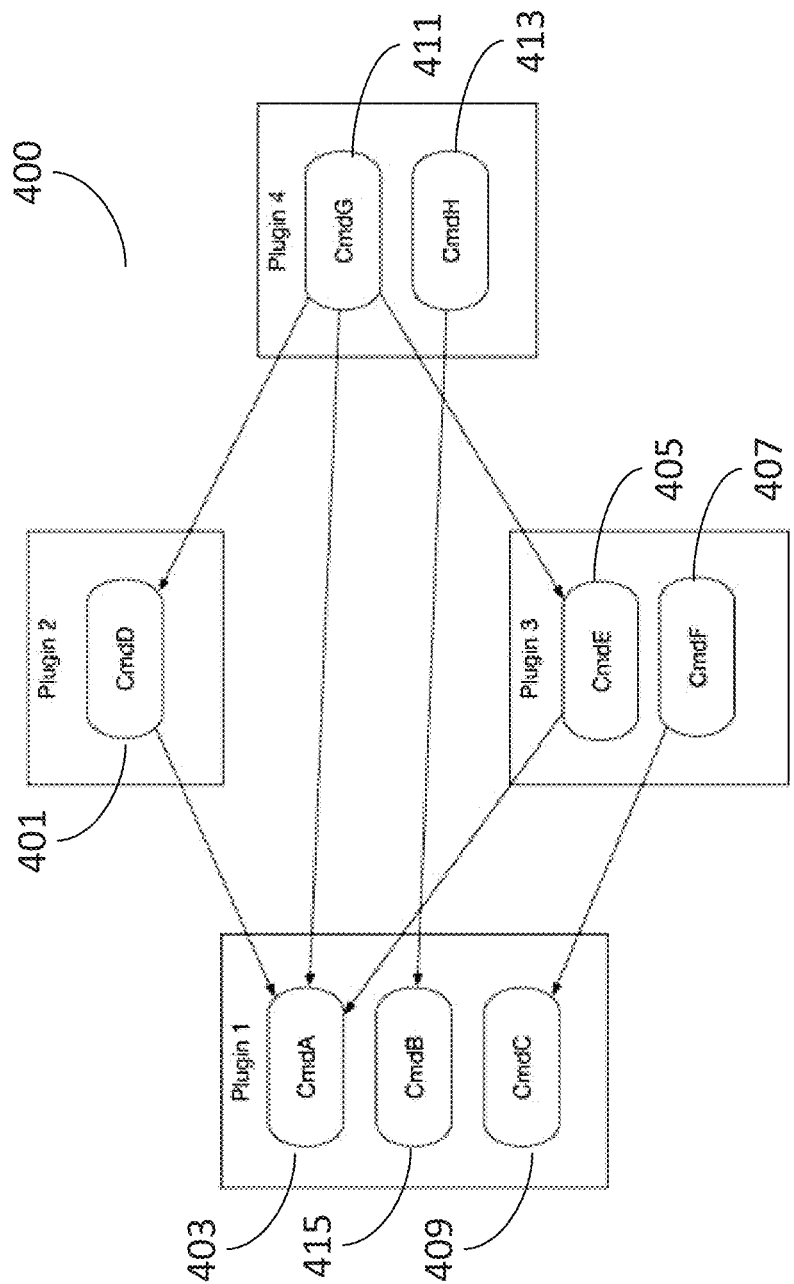

Finally, FIG. 4E shows a final set of Command DAGs for the current example wherein dependencies are registered from CmdG 411 to CmdE 405, CmdG 411 to CmdA 403, and CmdH 413 to CmdB 415.

Figure 5A:
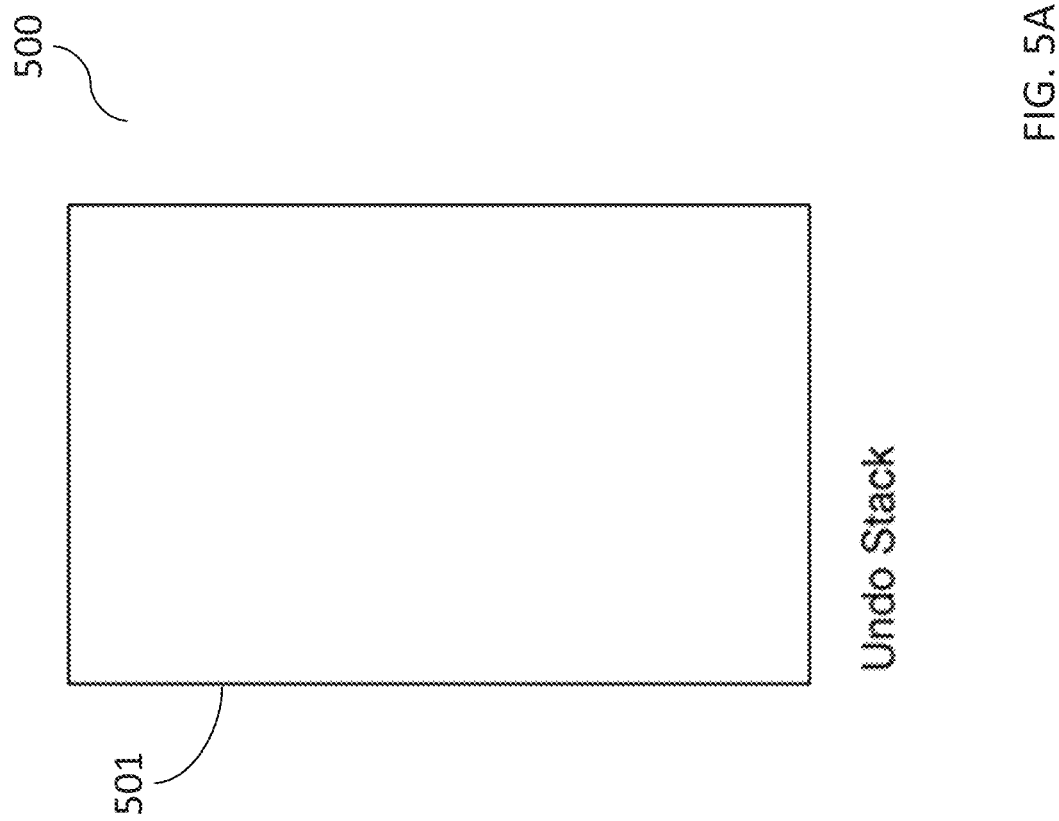

Moving from Command DAG registration to Command execution, FIG. 5A shows an example of a simple Command Stack, similar to the example discussed in FIG. 1, which may be referred to as the user command stack 500. When a user performs a data modification in the Graphical User Interface (GUI) of the application, a new command may be added to the users undo stack 501.

Figure 5B:
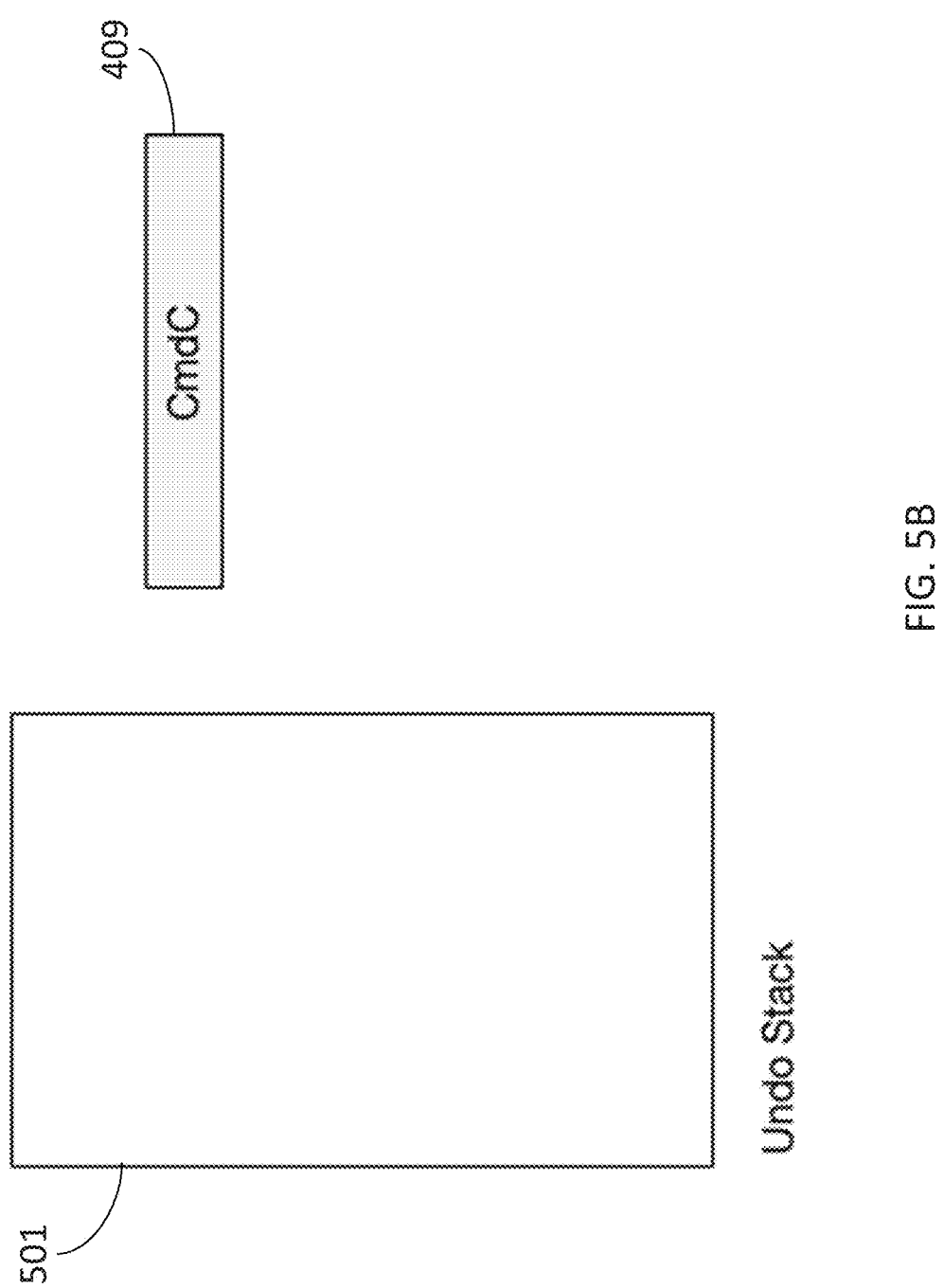

As shown in FIG. 5B, a user may perform an action that results in the execution of CmdC 409. The command system may construct an instance of CmdC 409 with a certain set of parameters resulting from the user action. FIG. 5B shows the instance of CmdC 409 has been constructed but not yet placed on the user command stack 500. The command system may then begin executing the instance of CmdC 409. As an example, CmdC 409 may correspond to a command for creating some new objects, and these new objects may need to be created prior to calling any downstream commands from CmdC 409.

Figure 5C:

FIG. 5C shows the created data 409a resulting from the object creation logic of command CmdC 409, where the created data 409a is shown underneath and indented to indicate its association with the originating command object, CmdC 409.

Figure 5D:
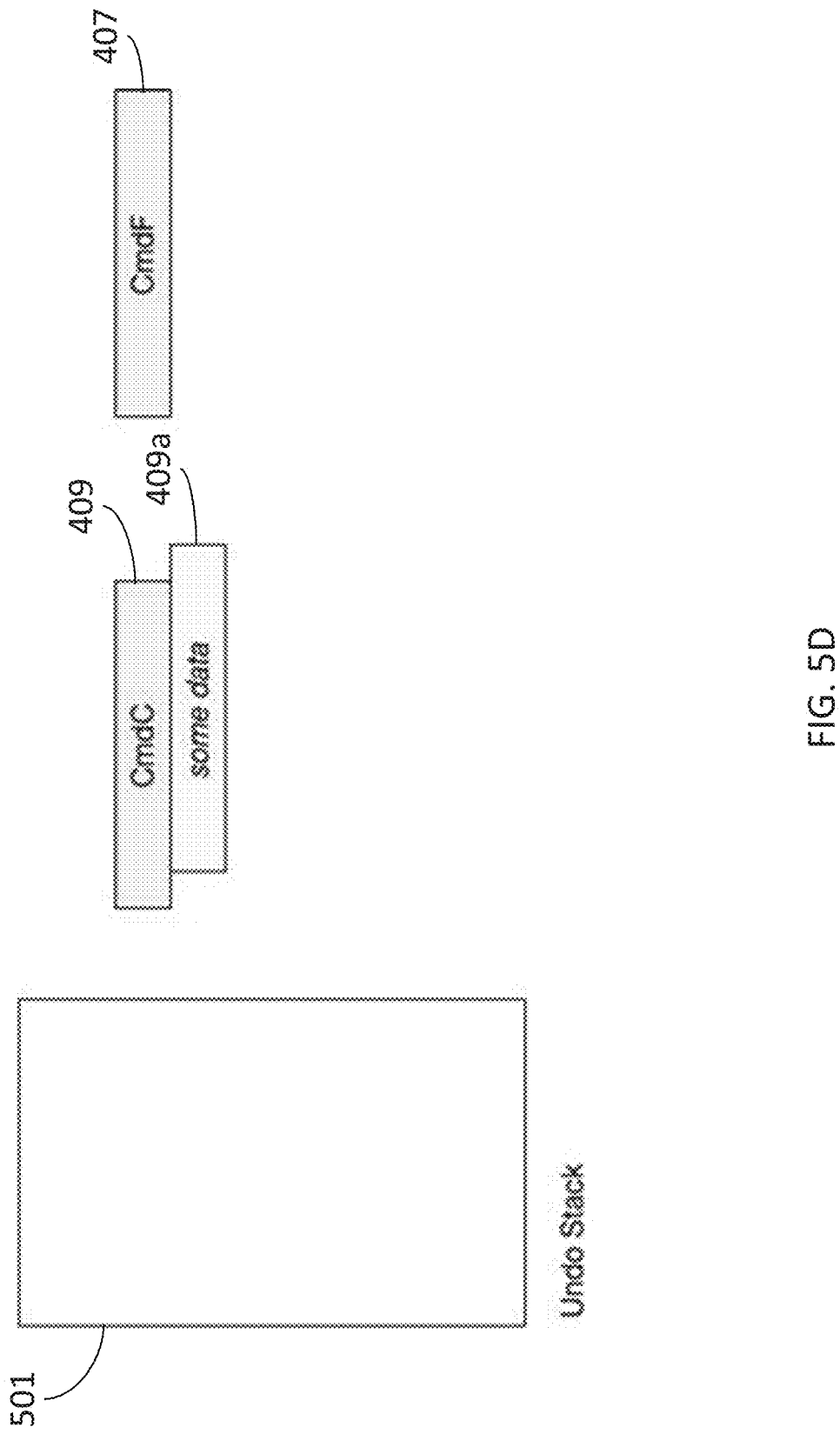

Now that the data 409a has been created by command CmdC 409, any downstream commands from CmdC 409 may be constructed and executed in order that they too may create some data. Based on the Command DAG 400 of FIG. 4E, command CmdF 407 is registered with CmdC 409 as a downstream command. Thus, CmdC 409 may request the command system to construct an instance of command CmdF 407. FIG. 5D shows the CmdF 407 instance has been constructed but not yet placed on any stack.

Figure 5E:
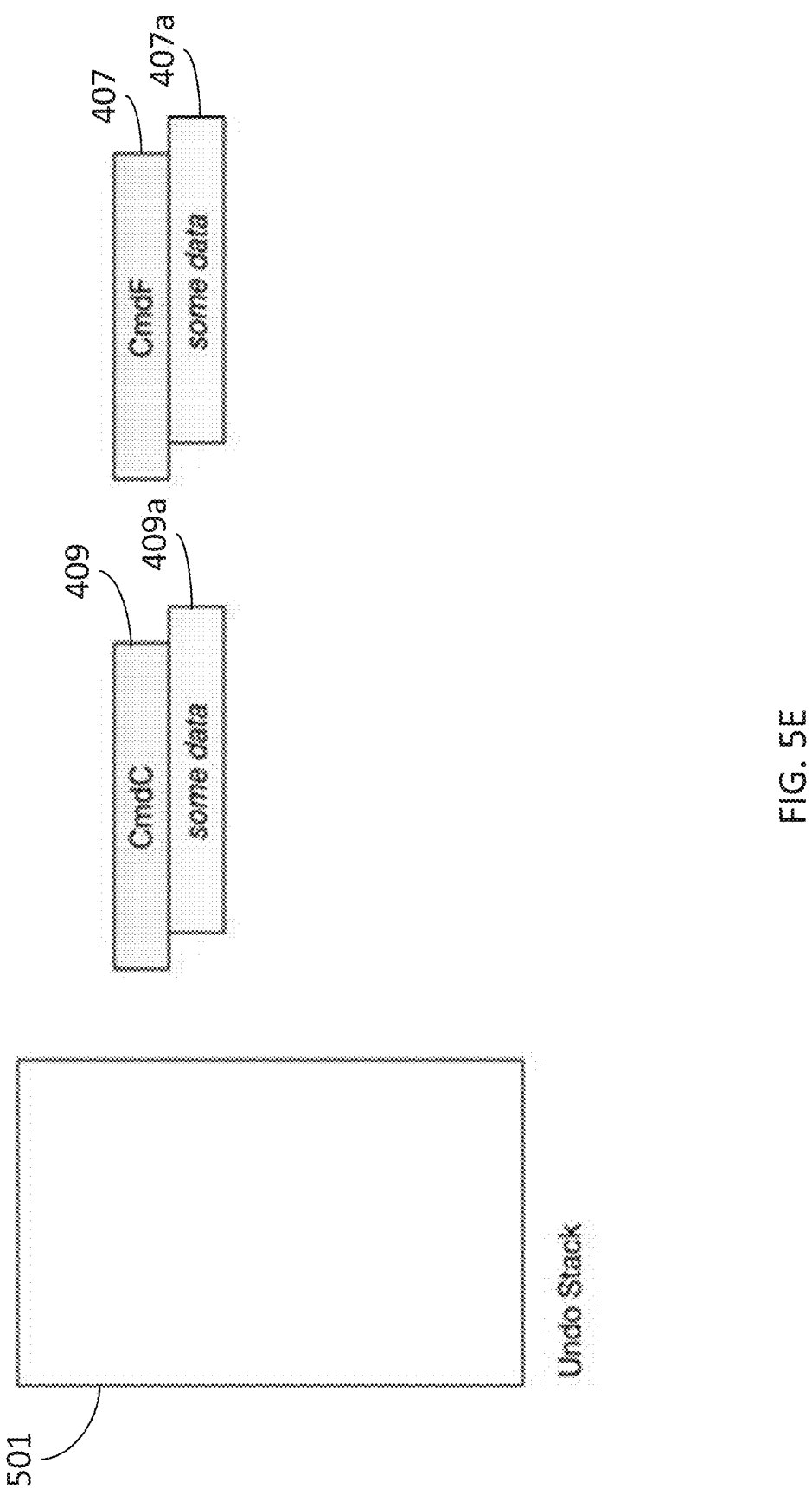

Similar to FIG. 5C, the instance of CmdF 407 may be executed to create data 407a for the command to facilitate action by downstream as well as upstream commands which may require the CmdF data 407a. Thus, FIG. 5E shows the result of CmdF 407 executing and creating some data 407a, which is positioned to indicate an association with the originating command object, CmdF 407.

If a command successfully completes execution, it must be added to a command stack 501. In embodiments of the present disclosure, if the command was instantiated by the user, it is added to the user undo stack 501, as discussed above in FIGS. 1A-1E and 2. However, in embodiments of the present disclosure, if the command was instantiated by an upstream command, then an internal stack of the upstream command is generated and the downstream command is added to the internal stack instead of the higher level user undo stack.

Figure 5F:
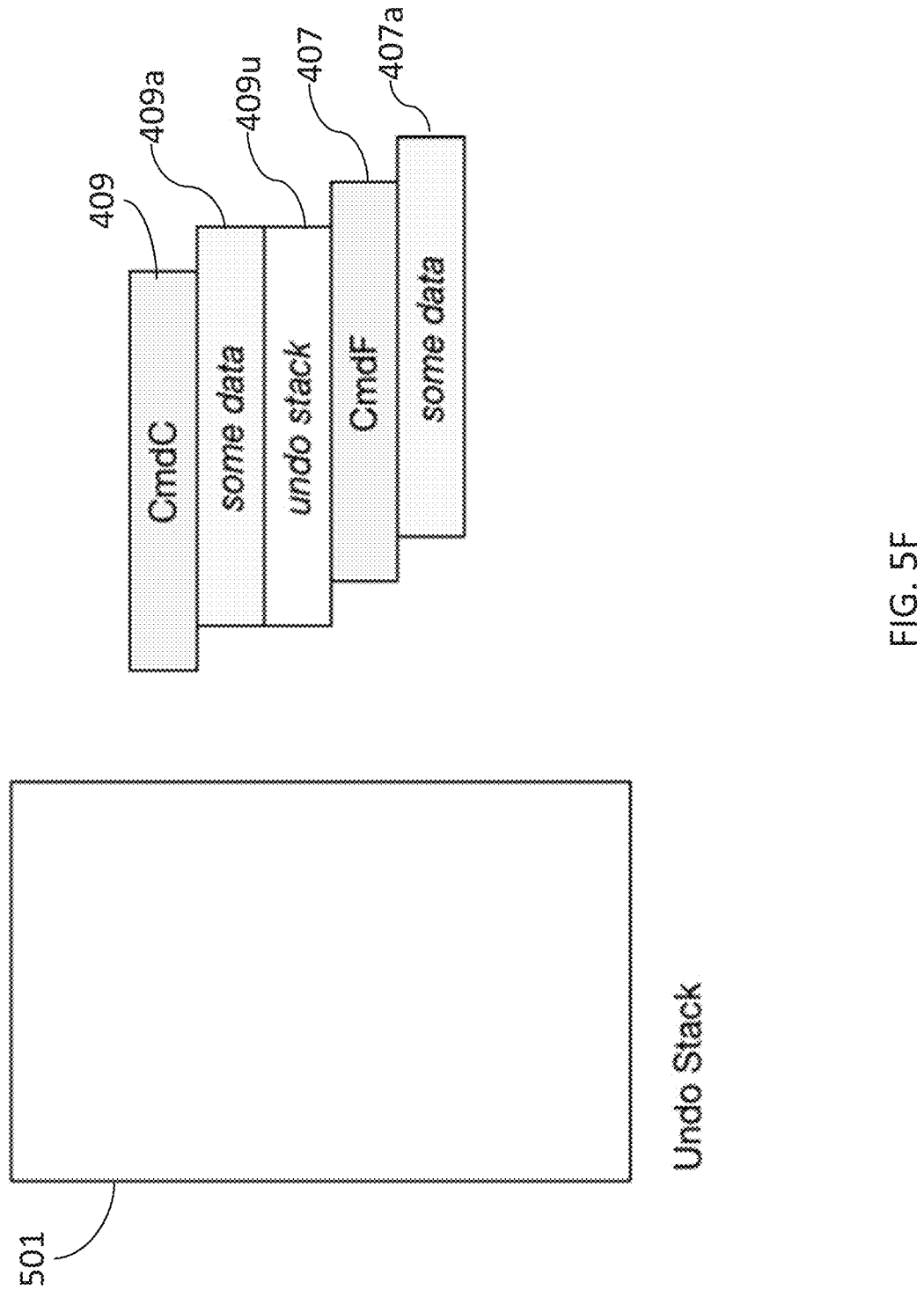

As shown in the example of FIG. 5F, CmdF 407 completes execution first prior to CmdC 409, and since it was instantiated by the upstream instance of CmdC 409, CmdF 407 is added to the internal stack 409u of CmdC 409, indicated in FIG. 5F as being indented and nested under CmdC 409. In some embodiments, the command system may determine that CmdF 407 is to be added to the internal stack 409u of CmdC 409 because CmdC 409 may still be currently executing at the user stack level 500. Thus, any downstream commands executed may be added to the internal stack 409u of the command that is currently executing. In other embodiments, CmdF 407 may be added to the internal stack 409u of CmdC 409 based on the instantiation of CmdF 407 from CmdC 409, wherein the source of instantiation is known at the command system level.

Figure 5G:
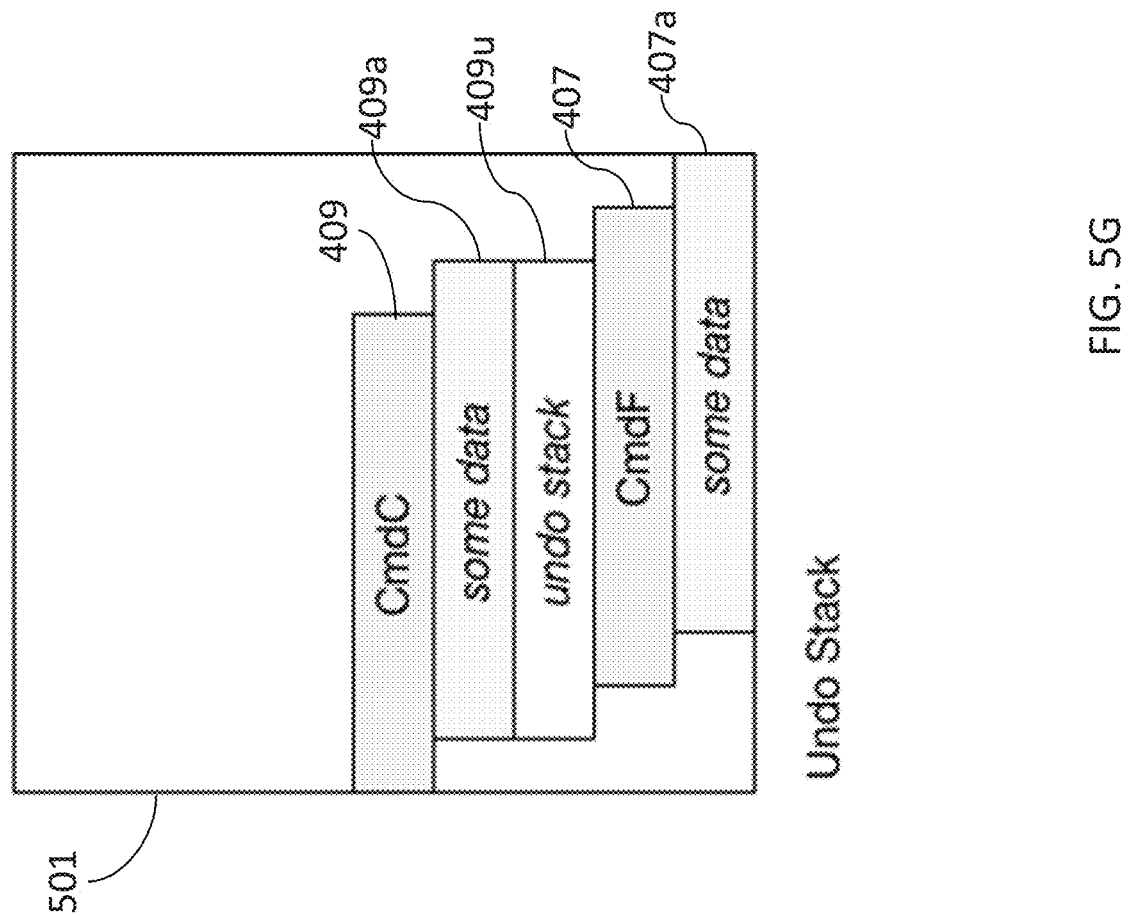

Further, since CmdC 409 was instantiated by the user, CmdC 409—along with its internal stack 409u including CmdF 407—is added to the user undo stack 501, as shown in FIG. 5G.

In the case of receiving an undo input, the command at the top of the user undo stack 501 is to be undone, as discussed above with respect to FIGS. 1A-1E. In the example of FIG. 5G, the top command is CmdC 409, and in response to an undo input, the undo method of CmdC 409 is called to undo itself. In some embodiments of the present disclosure, CmdC 409 may be configured to determine the order in which its internal data creation and downstream commands are undone from its internal stack 409u. Typically, undo of commands that create data require its downstream commands to be undone first before the data creation is undone, since the downstream commands are often executed to act upon the data that was created.

Figure 5H:
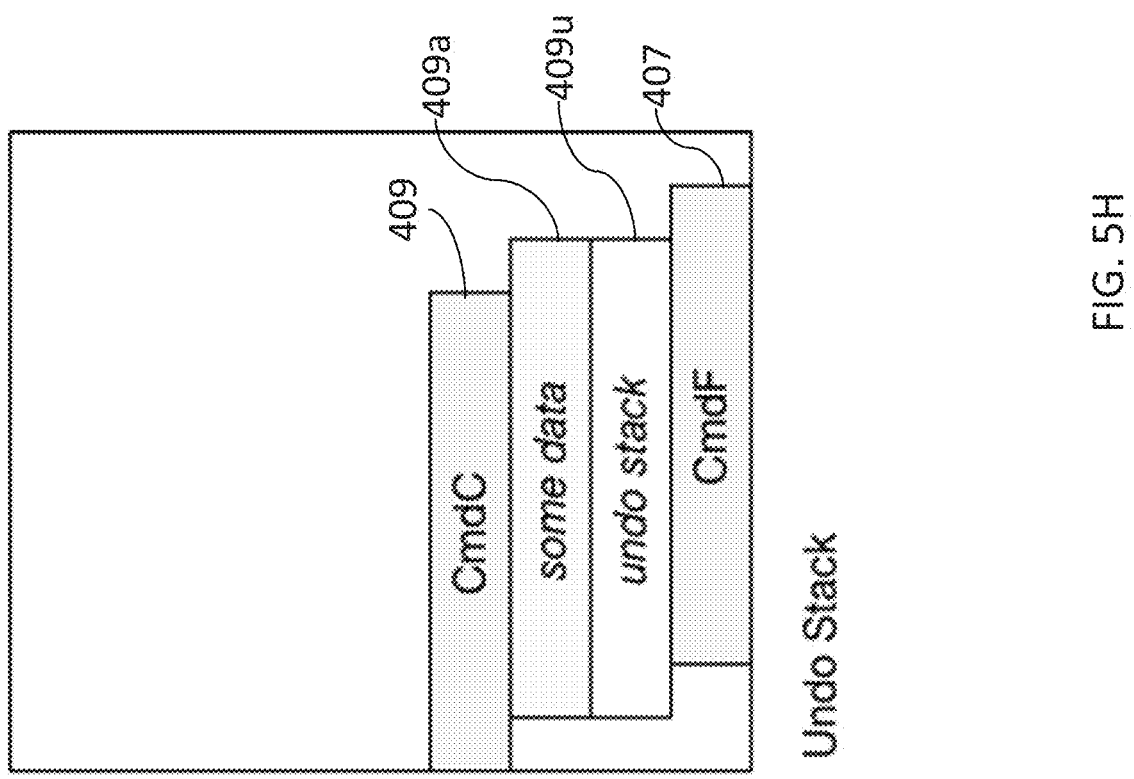
Figure 5I:
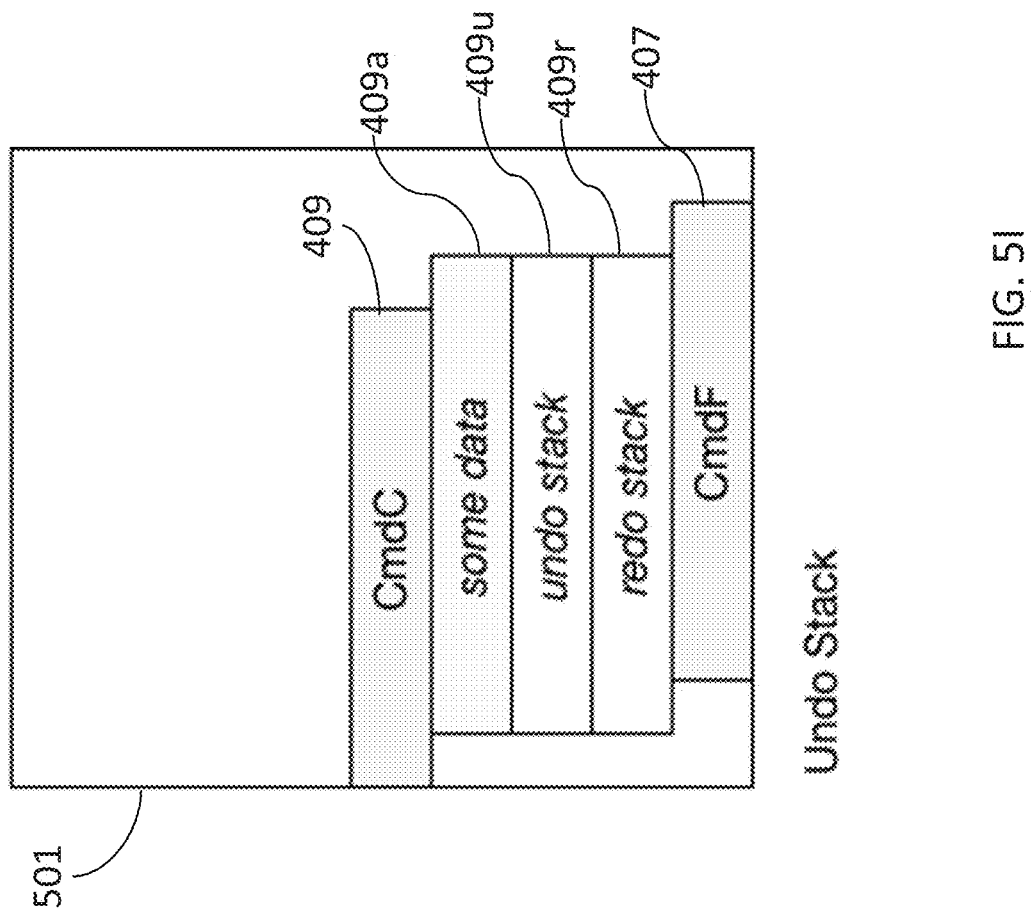

Therefore, as shown in the example of FIG. 5H, upon receiving an undo input, CmdC 409 may first instruct its downstream commands to undo, starting with CmdF 407 undoing the creation of some data 407a. As discussed, after a command has been undone, it may be moved from the undo stack 501, to the redo stack, and since CmdF 407 is being undone from the internal stack 409u of CmdC 409, CmdF 407 is moved to the internal redo stack 409r of CmdC 409—not the top level user redo stack—as shown in FIG. 5I. Again, the examples are shown as two separate stacks—and extended to the concept of the internal stacks 409u, 409r— however it will be understood that other implementations are considered, including a single stack with an index for the current state.

Figure 5J:
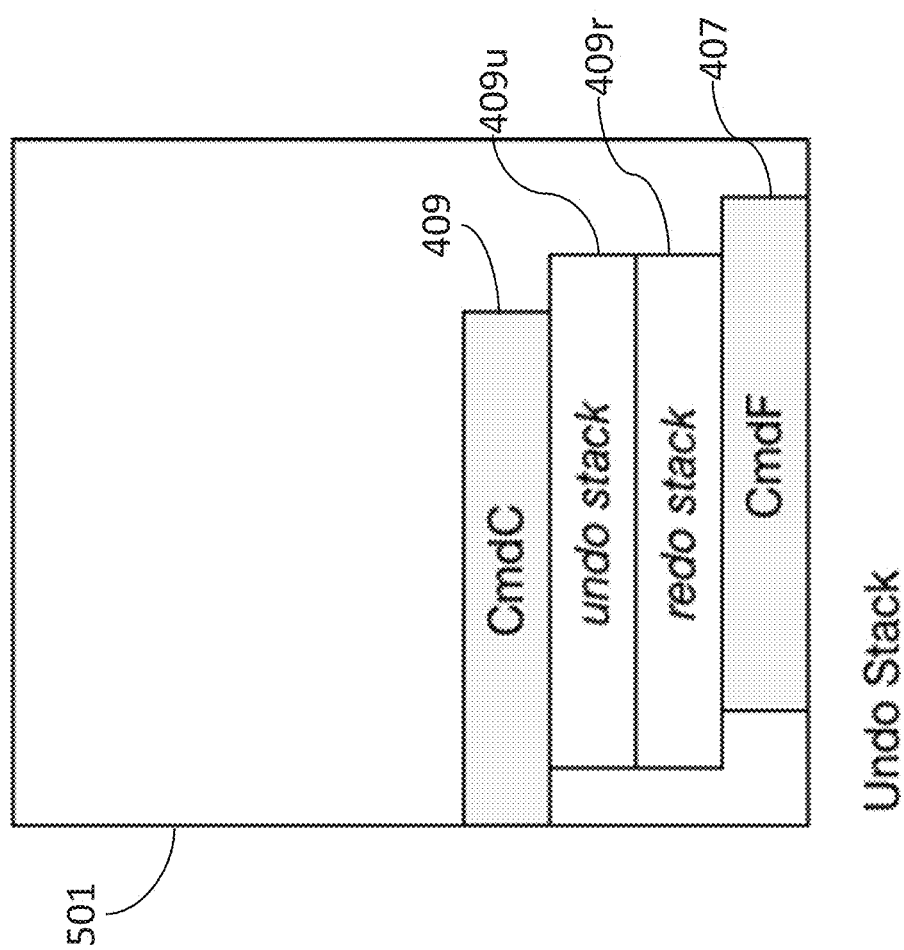
Figure 5K:
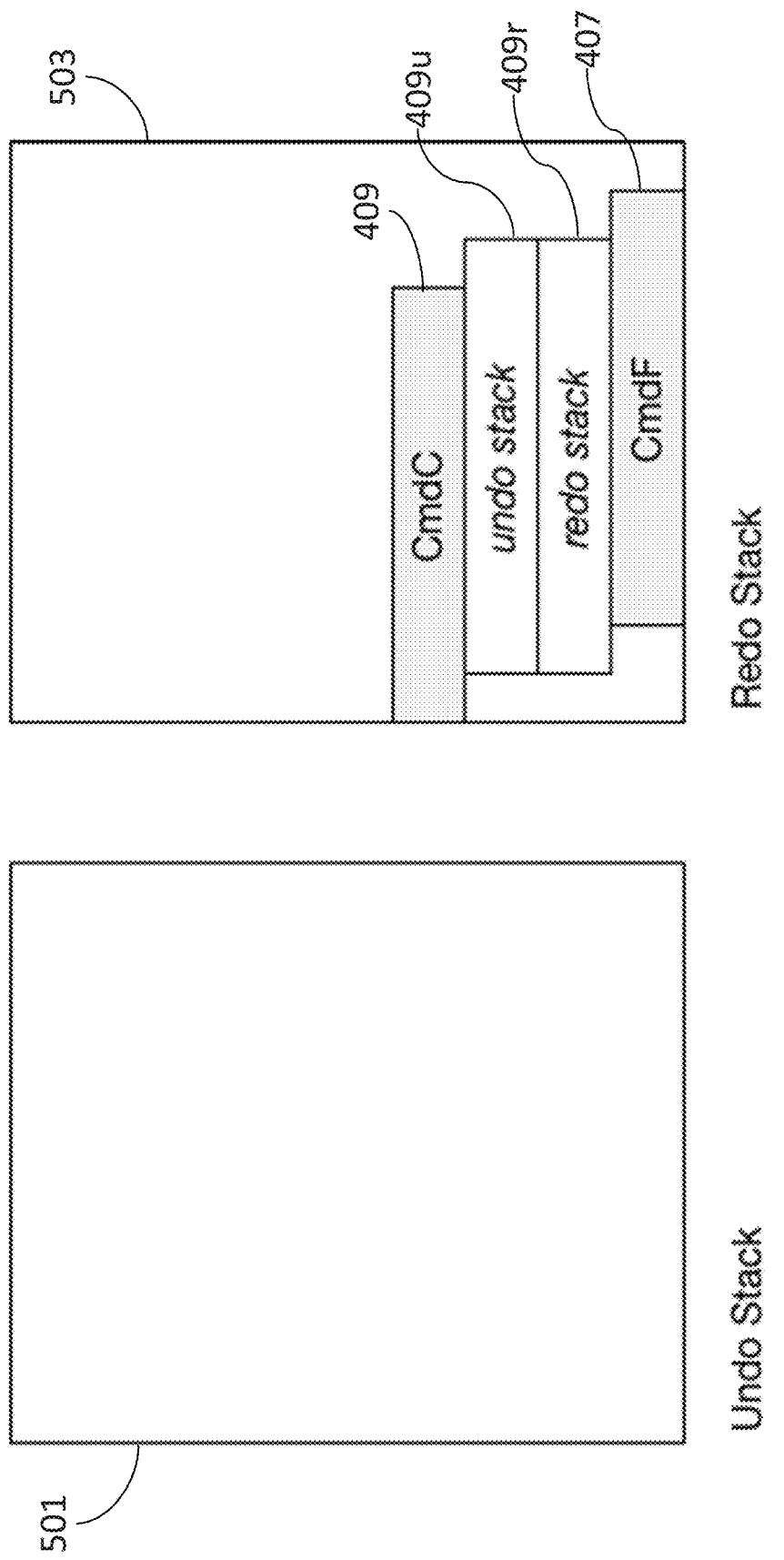

Now that all the downstream commands have been undone, CmdC 409 can undo the creation of its data 409a, as shown in FIG. 5J. Finally, CmdC 409 is moved from the user undo stack 501 to the user redo stack 503, as seen in FIG. 5K.

Figure 5L:
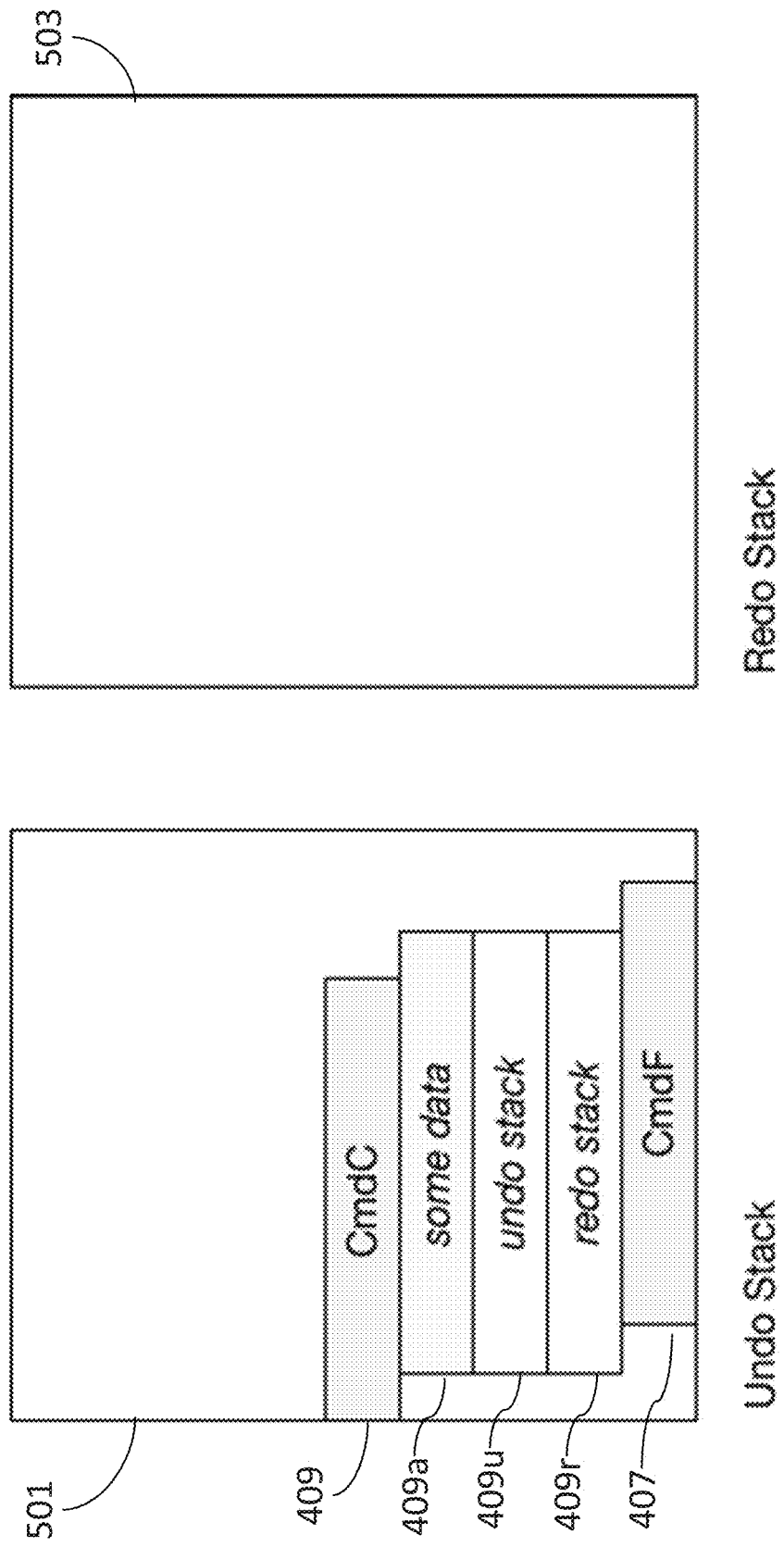

Redo may be performed very similarly to the initial execution of the command, as discussed with respect to FIGS. 1A-1E. In some cases, the commands in the user redo stack 503 may already be instantiated and may have cached some computations to perform redo faster than the initial execution. In the example of FIG. 5L, the command system may move the command CmdC 409 back to the user undo stack, then instruct CmdC 409 to redo, during which CmdC 409 will recreate its data 409a, and then CmdC 409 will in turn redo its downstream commands from its own internal redo stack 409r and then be moved back into the internal undo stack 409u of CmdC 409 (shown in FIG. 5M).

Figure 6A:
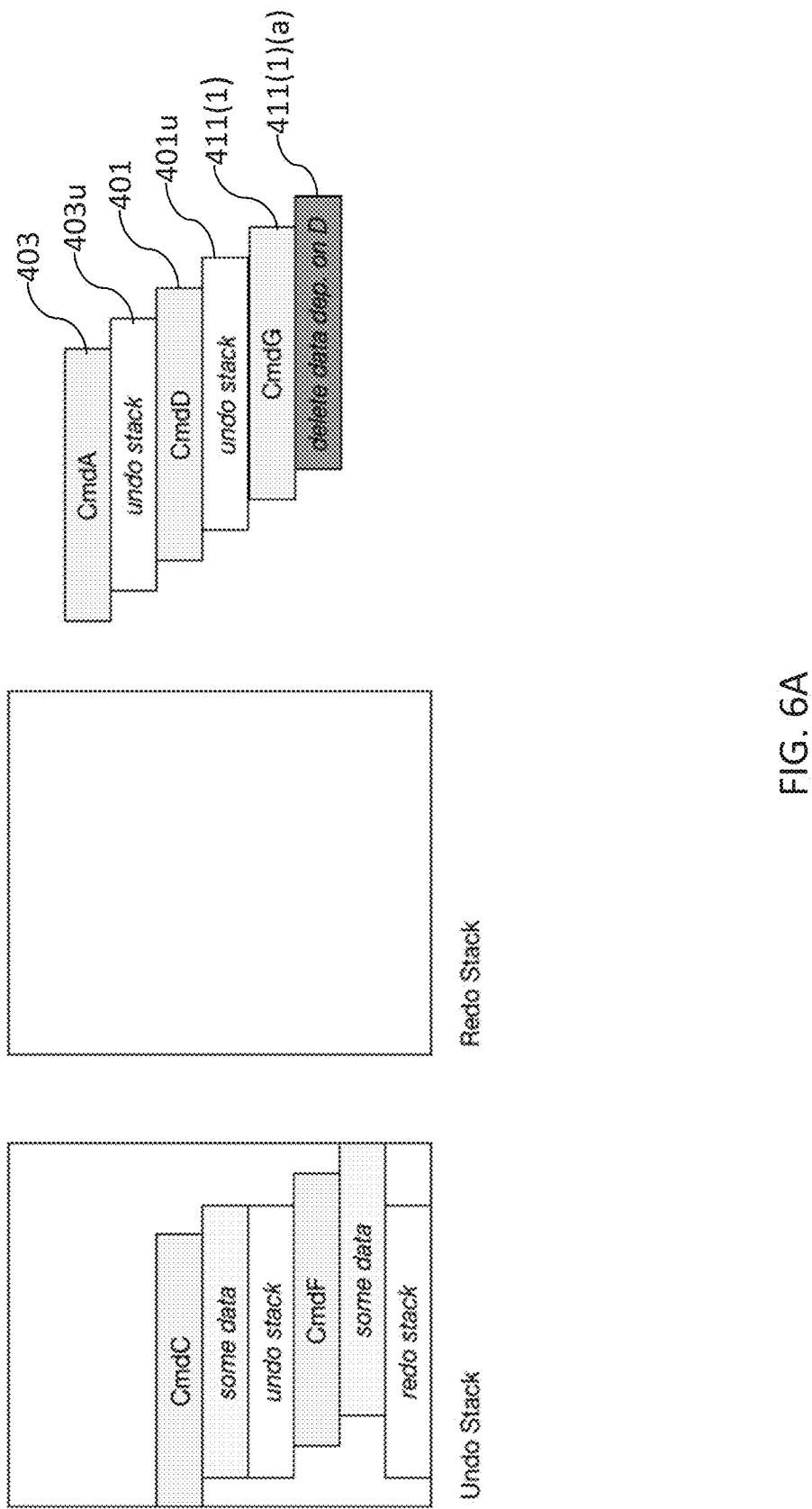
FIGS. 6A, 6B, 6C, and 6D are illustrations of implementing a command stack according to embodiments of the present disclosure.
Figure 6B:
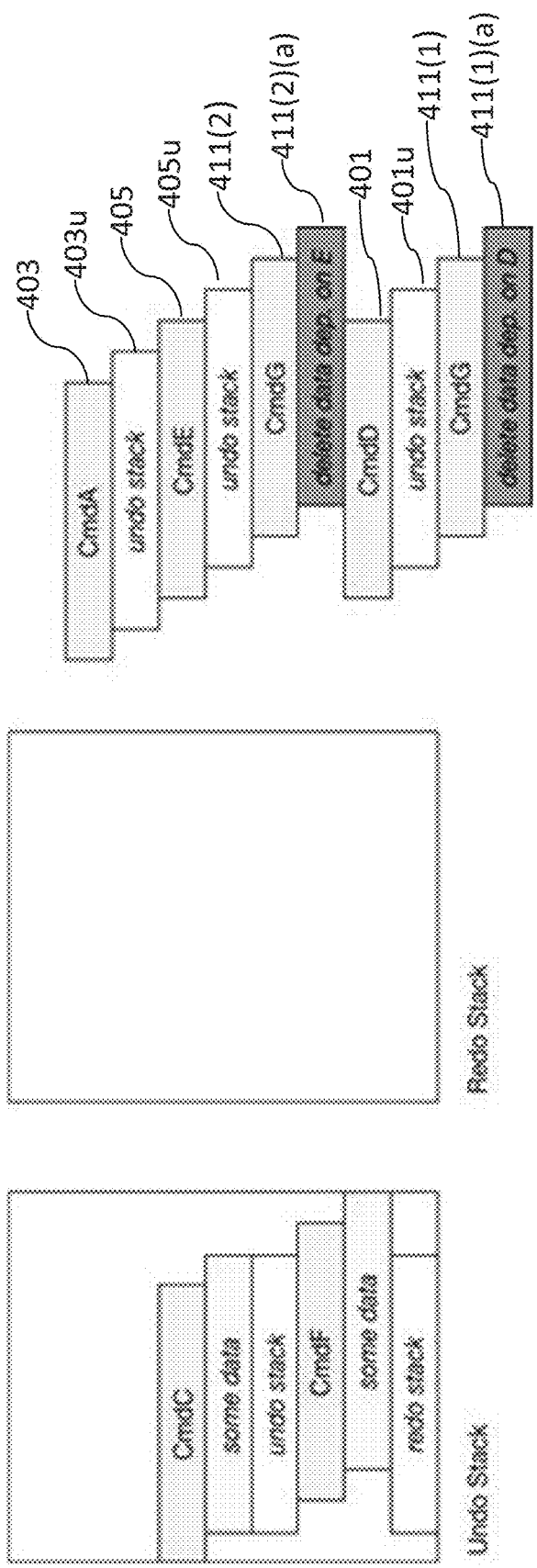
Figure 6C:
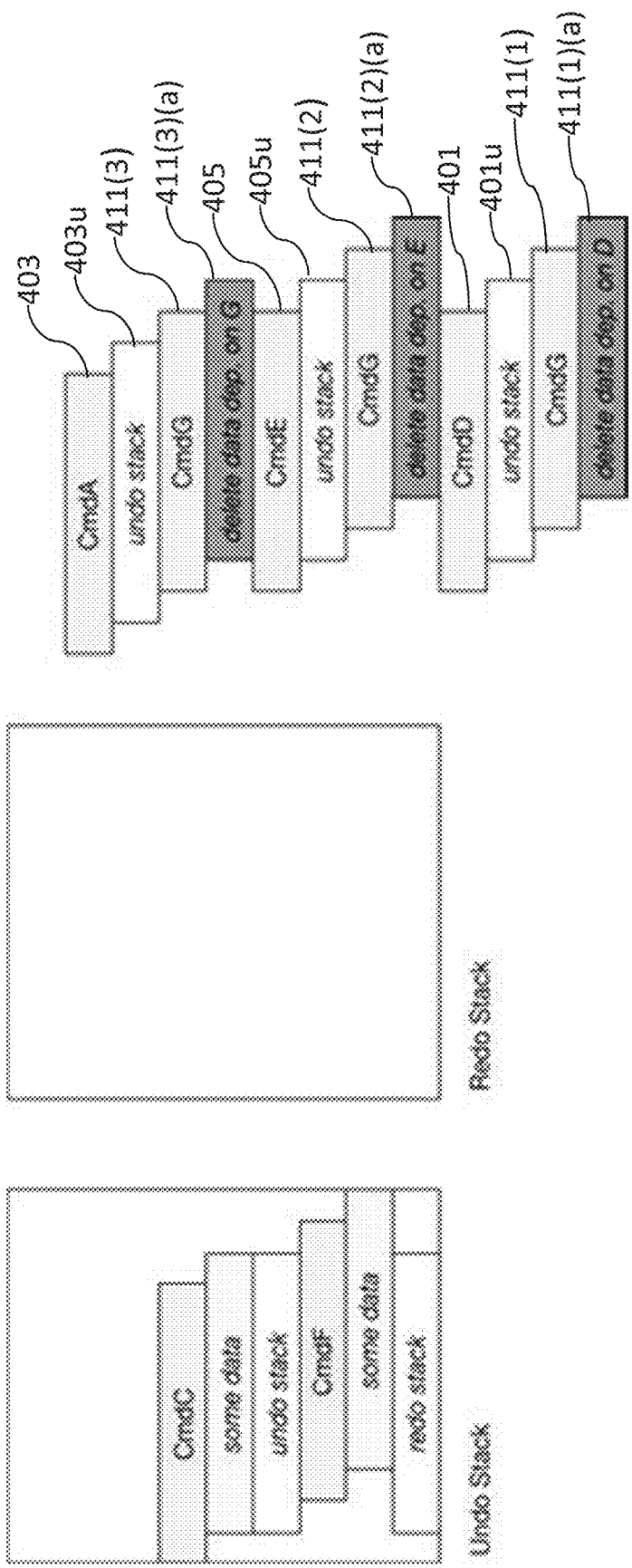

Referring now to FIGS. 6A-6C, another example is discussed with respect to execution of CmdA and its downstream commands, as discussed in FIG. 4E. The example from FIG. 5M of the user undo stack is continued such that CmdA is being instantiated and executed after the completion of the example of FIG. 5M. For the purposes of discussion, CmdA may be a deletion command.

As can be seen in FIG. 4E, CmdA 403 may have three downstream commands registered upon instantiation, CmdD 401, CmdG 411, and CmdE 405—with CmdD 401 and CmdE 405 having their own downstream commands, namely separate instances of CmdG 411 being dependent on each, respectively.

As shown in FIG. 6A, the command system first instantiates a CmdA 403 instance for initiating execution. During execution, CmdA 403 chooses to execute downstream commands first, starting with the instantiation and execution of CmdD 401. In some embodiments, the command system may instantiate commands for execution at a later time. In other embodiments, the command system may instantiate and execute commands at the same time.

Since this is a DAG, there may be multiple solutions to a topological sort and the relative ordering of the downstream commands may differ. However, based on the DAG of FIG. 4E, Plugin2 302 was initialized before Plugin3 303 so for the purposes of this example, it is presumed that CmdD 401 will be instantiated before CmdE 405. It is noted that the plugin registration order is one way to select the order in which downstream commands may be executed, but a command still has access to its downstream registry, and may select a different order based on any criteria, and in some cases the ordering may be arbitrarily selected. Further, in some embodiments, downstream commands may be registered with upstream commands at a time that is apart and independent from initialization of the downstream command. Thus in such cases, the ordering of the downstream commands may be selected based on a criteria that does not depend on the order of registration of the downstream commands.

For example, a downstream command may suggest an ordering of the commands among its sibling commands during its registration with its upstream command. In many cases, the upstream commands determine the ordering of execution of its downstream commands, and in some cases the downstream commands may not need to be instantiated and executed all at once. For example, the upstream command may elect to execute one or more downstream commands, perform other tasks or its own calculations unrelated to the downstream commands, and then return to instantiating and executing additional one or more downstream commands, and so on.

In yet other embodiments, upstream commands may have access to an interface by which they can receive information on the downstream commands in order to determine the order of execution. In some embodiments, the upstream commands may request additional information from its downstream commands if such information is required to determine an execution order. In other embodiments, the additional information of each downstream command may be provided to the upstream command at the time each downstream command is registered.

For example, through an abstracted interface, each downstream command may be configured to provide information about itself to the upstream command, including data that is specific to the particular instance of the command, a type operation performed by the downstream command, the amount of data that is to be generated or modified by the downstream command, or the data that is to be modified by the downstream command, and the like. The upstream command may utilize this information provided by each downstream command in determining the execution order.

As an example, where a first downstream command A is related to operations for graphics processing and another downstream command B is related to operations for core application data, the upstream command may receive this information and elect to execute downstream command B first—along with all its own core data operations—and then execute downstream command A at a later time, along with other operations related to graphics processing and user interfaces. As another example, if a downstream command A provides information that it generates or modifies only 2 kilobytes of data and writes the data to memory, and another downstream command B provides information that it requires generating or modifying 250 megabytes of data and writes the data to memory, the upstream command may order command A and command B based on availability of system resources such as memory throughput or anticipated computational requirements. Next, as shown in FIG. 6A, CmdD 401 executes (in response to CmdA 403), calling its downstream command first, resulting in an instance of CmdG 411(1). CmdG 411(1) then executes. It is important to note that at this point, CmdG 411(1) is only responding to an upstream instance of CmdD 401, and not to the upstream instances of CmdA 403, nor CmdE 405 at this point. Therefore, CmdD 401 will only delete data 411(1)(a) that depends on data created by Plugin2 302.

Next CmdE 405 will be instantiated and executed (in response to CmdA 403), calling its downstream command CmdG 411(2) first, resulting in another instance of CmdG, as shown in FIG. 6B. During an undo, this instance 411(2) of CmdG will delete data 411(2)(a) that depends on data created by Plugin3 303.

Figure 6D:
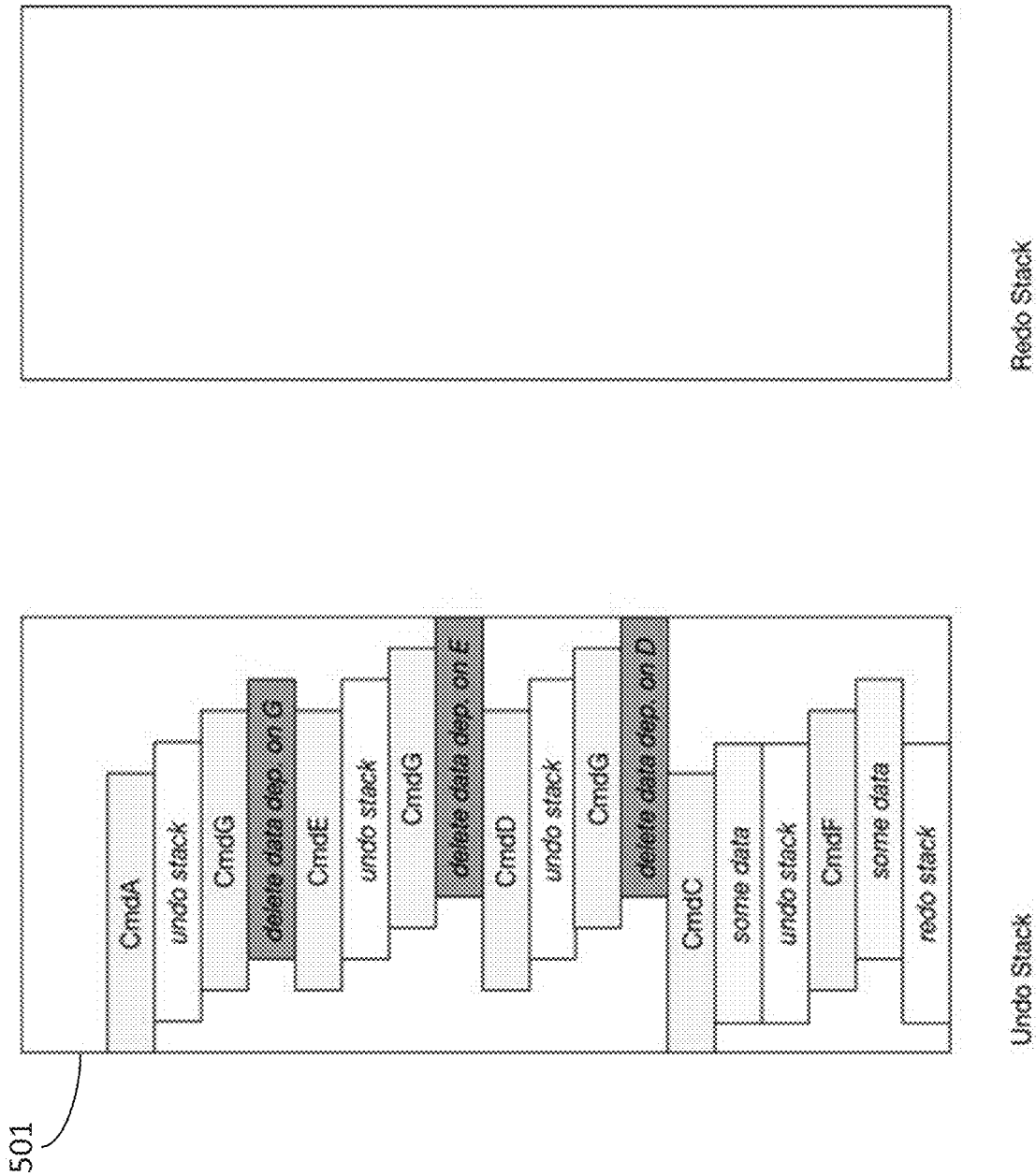

CmdG 411(3) will then be instantiated and executed (in response to CmdA 403), deleting data 411(3)(a) that depends on data created by Plugin1 301, as shown in FIG. 6C. Finally, CmdA 403 is added to the user undo stack 501, as shown in FIG. 6D.

In some embodiments of the present disclosure, while examples of FIGS. 5 and 6 started at the root of the DAG, this is not the only way a command can be executed. In some embodiments, the user may begin execution by initiating a command in the middle, or at the end, of the DAG. For example with reference to FIG. 4E, CmdD 401 may be initiated first by the user. In this case, CmdD 401 can choose to execute its downstream command, CmdG 411, and then explicitly call its upstream command CmdA 403, or vice versa. The instantiation of CmdA 403 may result in downstream commands being instantiated again, including another instance of CmdD 401.

In some embodiments, the modules may be configured such that the data that was passed to upstream command CmdA 403 by downstream command CmdD 401 results in the second instance of CmdD 401 being non-operational and/or recognizing that a first instance exists and omitting certain data or actions accordingly. Thus, allowing the DAG to be initiated by the user at any point along the graph may provide increased flexibility without compromising the integrity of the command stack.

Referring now to FIG. 7, a flowchart 700 depicting an example of an embodiment of the present disclosure is provided. At block 701, an input is received for executing a first command of the application. The received input may be received via an input interface of a terminal executing the application, such as a mouse, keyboard, touchscreen, stylus input, virtual or augmented reality enabled input, voice input, and the like.

The received input may specify a user action or command to execute with respect to particular data, object, and the like. For example, within a digital content creation (DCC) application used for animation, the received input may correspond to a command to create a joint of a character rig for a computer animation project. As discussed with respect to FIG. 6D, the command may correspond to a root of a command DAG or it may correspond to a middle or end node of the command DAG, Next at block 702, execution of the first command may be initiated. As discussed with respect to FIG. 5B, the command system may construct an instance of the first command with a certain set of parameters resulting from the user action. The instance of the first command may be constructed but not yet placed on the user command stack. The command system may then execute the instance of the first command and generate or edit any data resulting from execution of the first command.

As an example, the first command may correspond to a command for creating some new objects, and these new objects may need to be created prior to calling any downstream commands from the first command.

At block 703, the one or more second commands may be executed based on the first command. In some cases, there may be one second command registered to be a downstream command from the first command, and in other cases, there may be more than 1 and up to large number of second commands registered to be downstream commands from the first command.

As discussed with respect to FIG. 5E, any downstream commands from the first command may be constructed and executed in order that they too may create some data. Thus, the one or more second commands may request the command system to construct an instance of each of the one or more second commands. Also, as discussed with respect to FIG. 6B, in some embodiments the one or more second commands may themselves have one or more additional commands which are registered to be downstream from the one or more second commands.

Similar to FIG. 5C, the instance of the one or more second commands may be executed to create data for the command to facilitate action by downstream as well as upstream commands which may utilize the data from the one or more second commands.

Next at block 704, the execution of the first command is completed, and thereafter at block 705, the one or more second commands may be included in a nested command stack that is associated with the first command. As discussed in the example of FIG. 5F, CmdF 407 completes execution first prior to CmdC 409, and since it was instantiated by the upstream instance of CmdC 409, CmdF 407 is added to the internal stack 409*u* of CmdC 409.

In some embodiments, the command system may determine that CmdF 407 is to be added to the internal stack 409*u* of CmdC 409 because CmdC 409 may still be currently executing at the user stack level. Thus, any downstream commands executed may be added to the internal stack 409*u* of the command that is currently executing. In other embodiments where nested command stacks are not implemented, a command identifier or pointer to each downstream command may be registered with its upstream command, or vice versa, to track the dependencies and associations between commands on the same single level command stack. In such embodiments, the command identifier or pointer may also include information on which instance of each command is involved in the defined dependency, as several different instances of the same command can exist at the same time, as shown for example in FIG. 6C.

At block 706, the first command and the first nested command stack of the first command may be included in the command stack. As discussed in the example of FIG. 5G since the first command was instantiated by the user, the first command—along with its internal stack including the one or more second commands—is added to the user undo stack.

In the case of receiving an undo input, the command at the top of the user undo stack is to be undone. In the example of FIG. 5G, the top command is CmdC 409, and in response to an undo input, the undo method of CmdC 409 is called to undo itself.

In some embodiments of the present disclosure, the first command may be configured to determine the order in which its internal data creation and downstream commands are undone from its internal stack. Typically, undo of commands that create data may require its downstream commands to be undone first before the data creation is undone, since the downstream commands are often executed to act upon the data that was created.

Thus, according to embodiments of the present disclosure, a DAG may be implemented to clearly define dependencies between upstream and downstream commands, allowing the user stack to maintain the ordering and nesting of various commands. Even where multiple instances of a particular module exist in the user stack, with each instance being dependent from different upstream modules, embodiments of the present disclosure provide for nested internal stacks so that each instance of the downstream module is called upon to undo or redo only at the correct time and only to act upon the correct data.

Based on the present disclosure, significant improvements to the functioning of applications and terminals executing the applications may be realized. For example, errors may be substantially reduced in executing various commands from the command stack during undo and redo actions. For complex animation projects in which there may be a large number of downstream commands stemming from a single upstream command, as well as interdependencies and multiple instances of common commands depending from different DAG nodes, the embodiments of the present disclosure provides a clear handling of command stack based actions for determining the ordering in which data and corresponding commands are to be handled.

Additionally, embodiments of the present disclosure may also result in improved computation time and conservation of computing power, since additional computation to determine the dependencies between commands and their created/edited data prior to actual execution of undo or redo commands may be avoided.

Usability of the applications and terminals of the present disclosure may also be significantly improved as well since many of the downstream commands and their data changes may not be made visible to the user by the application interface. Thus, the application performance may remain consistent with user expectations, for example while undoing a single command, where the back-end may include undoing a large number of downstream and inter-level command dependencies.

In terms of a user initiating a command at a point along the DAG as discussed above, embodiments of the present disclosure may provide a dynamic action-object switching workflow to allow a user to effectively and efficiently identify actions and their corresponding operations parameters suited to the user's workflow preferences in order to execute commands in the DAG.

An action within an application is a user operation that requires interactive specification of the operations parameters. The order in which a user is required to select either the action to be performed or the operation parameters, or objects, on which the action is to be performed, may differ according to various applications. In some applications utilizing strictly an object-based workflow, the operations parameters may be required to be identified or selected by a user before the action may be selected for execution. This presents issues where the action's operations parameters—or their ordering—are unknown to a user at the time of selecting the action, or where incorrect or incompatible objects are selected as operations parameters, leading to errors during execution of the action.

By contrast, other applications utilizing strictly an action-based workflow, the action must be selected by a user before the operations parameters are identified, and in some cases, prompts may be used to indicate a number and type of operations parameters required for the selected action. However, this also presents issues wherein the user is unable to dynamically alter the actions to be performed once selection of the operations parameters or presentation of the interface prompts is initiated.

The contrast between the object-based vs. action-based workflows may be typically shown in an example of a parent joint operation during creation of an animated character rig whereby the user wishes to define a parent-child relationship between a potential parent joint and one or more child joints in a transform hierarchy. For the object-based workflow, the user must first select a single parent joint, then one or more child joints, and finally specify the parent joint action. For the action-based workflow, the user must first run the parent joint action, then select the parent joint, followed by the children. However, applications are limited to these two types of workflows, and a user is unable to utilize a workflow which dynamically switches or adjusts to a user's determined preference.

Thus, embodiments of the present disclosure includes an interactive action-object dynamic workflow which allows a user to select actions for execution, along with objects as operations parameters while being provided with flexibility for dynamically switching to another workflow if necessary or preferred by the user, for example in making or changing selected operations parameters. Embodiments of the present disclosure may include an interface of the application which allows a user to select either an action to be executed or objects for executing various actions, initiating an action-based or object-based workflow, while continuing the user selections using another workflow suited to the user's preferences or constraints of each particular case.

Figure 8A:
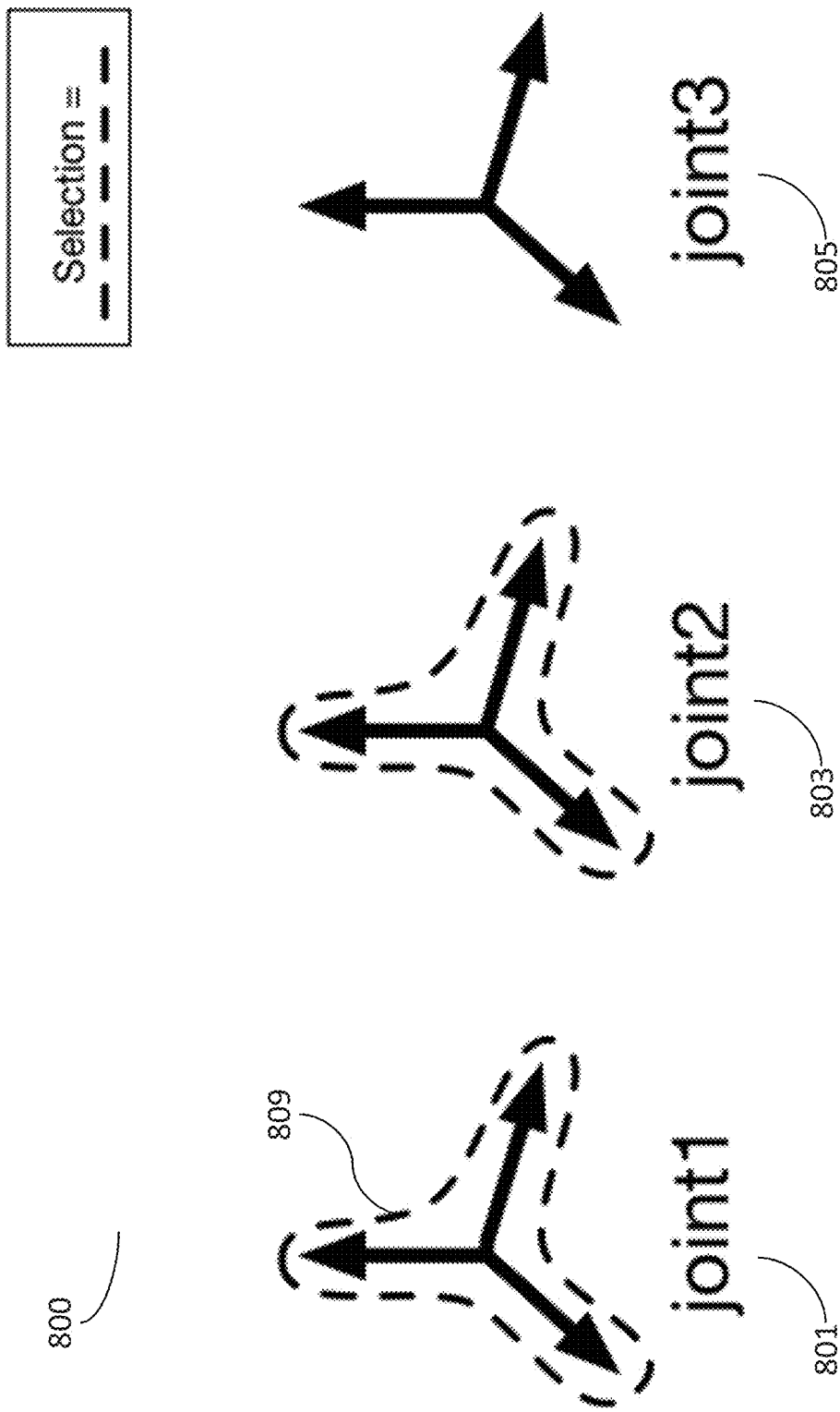

Using the above parent joint operation, an example of the present disclosure is described with reference to FIG. 8A. FIG. 8A shows a simplified portion of a rigging application 800 in which three joints 801, 803, 805 of the rig are shown and made available for selection and editing. Selection of a particular joint is denoted by the dotted line 809 in the following figures.

Since the parent joint operation requires a minimum of two joints to be selected as operations parameters (one parent joint, and at least one child joint), if the user selects more than one joint 801, 803, as shown in FIG. 8A, the parameters are satisfied in an object-based workflow and the parent joint operation may be executed without any errors or display of any interactive interface.

However, if the user selects only a single joint 801, as shown in FIG. 8B, and the parent joint operation is selected for execution, embodiments of the present disclosure may switch the object-based workflow to an action-based workflow to accommodate for the deficient selection of operations parameters instead of executing the action and generating errors. Switching to the action-based workflow may include displaying or otherwise providing an interactive parameters interface in which the user is informed of the number and type of parameters required for execution of the selected action.

In the example shown in FIG. 8C, an interactive parameters interface 810, or other information prompt, may be displayed to the user. The interactive prompt 810 may include information on the action 812 that was selected, the parameters 814a, 814b required for the action, and any parameter values 814a which have already been correctly selected for the action. The interactive prompt 810 may also include additional descriptors 816 to aid the user in evaluating the parameter requirements and making acceptable selections. Since the first selected joint 801 may already be determined to be correctly selected, the interactive prompt 810 may populate the first parameter value 814a with the selected joint 801, and additionally prompt the user to select one or more children via parameter input 814b, and its descriptor 816, as seen in FIG. 8C.

Figure 8D:
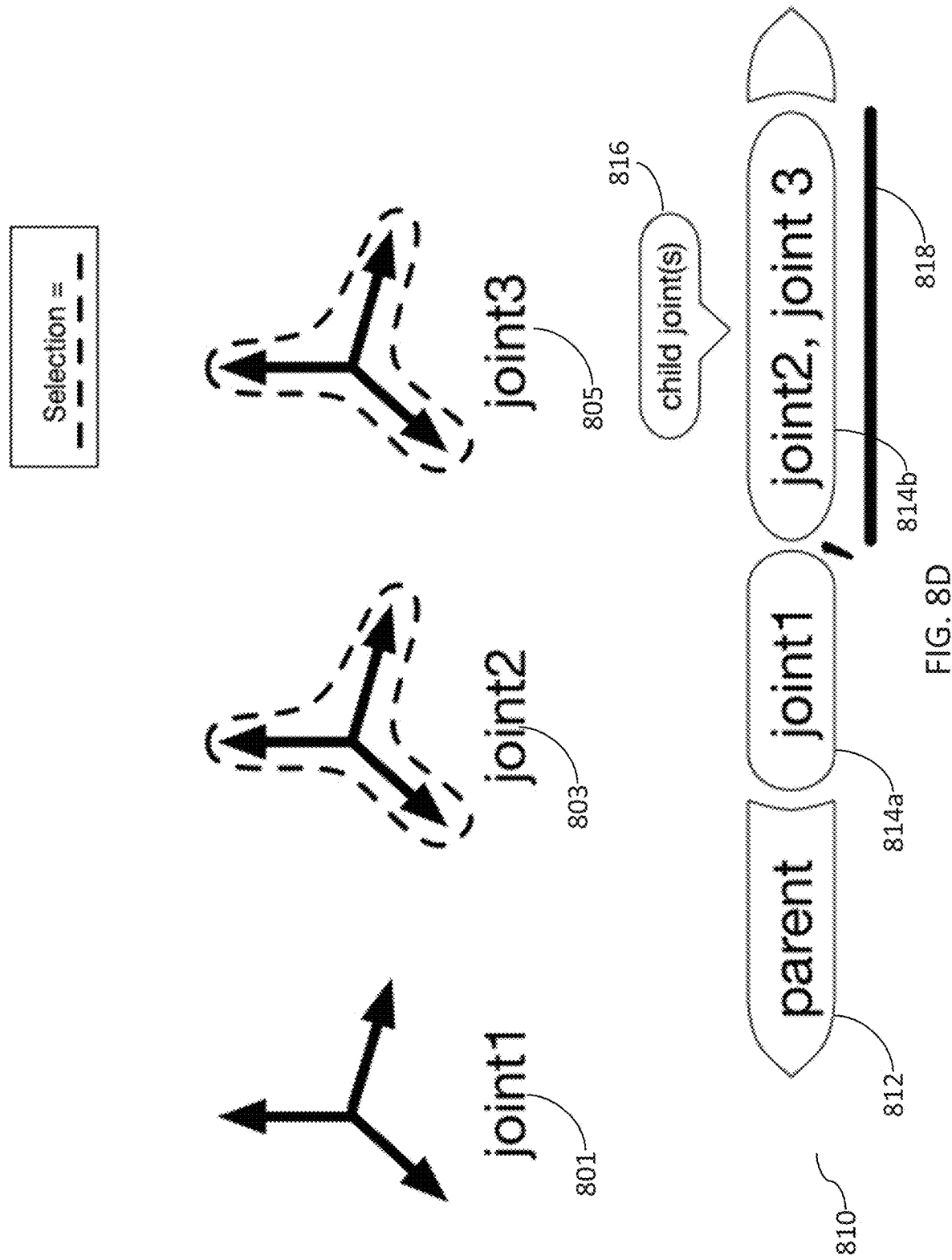

In some embodiments, the interactive prompt 810 may provide the user the ability to expand the selection 814b within the parameters of the selected action 812. Thus, as shown in FIG. 8D, the interactive prompt 810 may allow a user to select multiple joints 803, 805 to be input to the child joint input parameter 814b of the parent joint operation. To indicate that additional selection of parameters may be possible, the interactive prompt 810 may include a visual indicator or cue, such as an underline or blinking cursor 818 indicating that the parameter field 814b remains further editable. In other embodiments, other visual cues may be used, such as additional empty spaces, blank input fields, and the like.

While the input parameter 814*b* is shown with focus in the interface 810, the user can select the child joints 801, 803, 805 and the parameter will be populated, as seen in FIG. 8D. After specifying the children 814*b*, the action 812 can then be executed upon input by the user, for example by pressing the Enter key or other button or interface object indicating execution.

In some embodiments of the interactive action-object dynamic workflow, a pure action-based workflow 819 may also be initiated as shown in FIG. 8E. This can be particularly useful for users who want to discover what parameters 814*a*, 814*b* are required for a given action 812, or more frequently, what order the parameters must be specified in.

For example, a user may select the parent joint operation 812 for execution with no parameter selection, as seen in FIG. 8E. In such cases, embodiments of the present disclosure would provide the user with an interactive prompt 819 with information on the selected action 812 and its required parameters 814*a*, 814*b*, 816 and ordering. For example, with the parent joint 814*a* parameter focused 818—as in FIG. 8E—the user may be able to select a joint 801, 803, 805 to populate the parent joint parameter 814*a*. Pressing a key such as Tab or an arrow key could shift the focus 818 of the interactive prompt 819 on the next parameter of the action, or the child joints parameter 814*b*. Selecting one or more joints 801, 803, 805 would populate the child joints parameter list 814*b*, similar to FIG. 8D.

One example of the interactive prompt is shown in the figures, however it will be understood by those of ordinary skill in the art that various different appearances and types of interactive prompts may be provided to the user. For example, the interactive prompt may provide information to the user one step at a time, such as displaying information for selecting one input at a time, instead of the complete parameter list for the action. Additionally, populating the interactive prompt may be performed using various different input methods, including key presses, touchscreen inputs, voice inputs, mouse inputs, and the like.

In yet other embodiments, the interactive prompt may present the user with a list of selectable options for each parameter. For example, in FIG. 8E, when the focus is on the parent joint parameter 814*a*, the interface may present the user with a list with selectable options (such as a drop down list, radio button list, or the like), where each option in the list corresponds to an object currently within the view of the application, such as joints 801, 803, 805. Thus, the list may filter out objects which exist in the project, but are not presented within the currently visible view of the application.

Further, the list may also be filtered to show only the types of objects which are eligible for selection for the particular input parameter. Therefore, in the example of FIG. 8E, if joint3 805 is not able to be used as a parent joint to any other joints, only joint1 801 and joint2 803 may be included in a list when the user is selecting a parent joint input parameter 814*a*. However of course, other embodiments may include presenting a selectable list with all existing objects within the project regardless of current view or object type.

It will be understood that the selection types of objects as input parameters may be greatly varied. Embodiments of the present disclosure may support interactive parameters for any type the application supports. These include geometric models, vertices, edges, faces, controls, curves, constraints, animation pages, drawings etc. For example, an action named "drive vertex" 830 may be defined with 3 parameters having different object types: a joint 831, a curve 832, and a vertex list 833, as shown in FIG. 8F.

Figure 9:
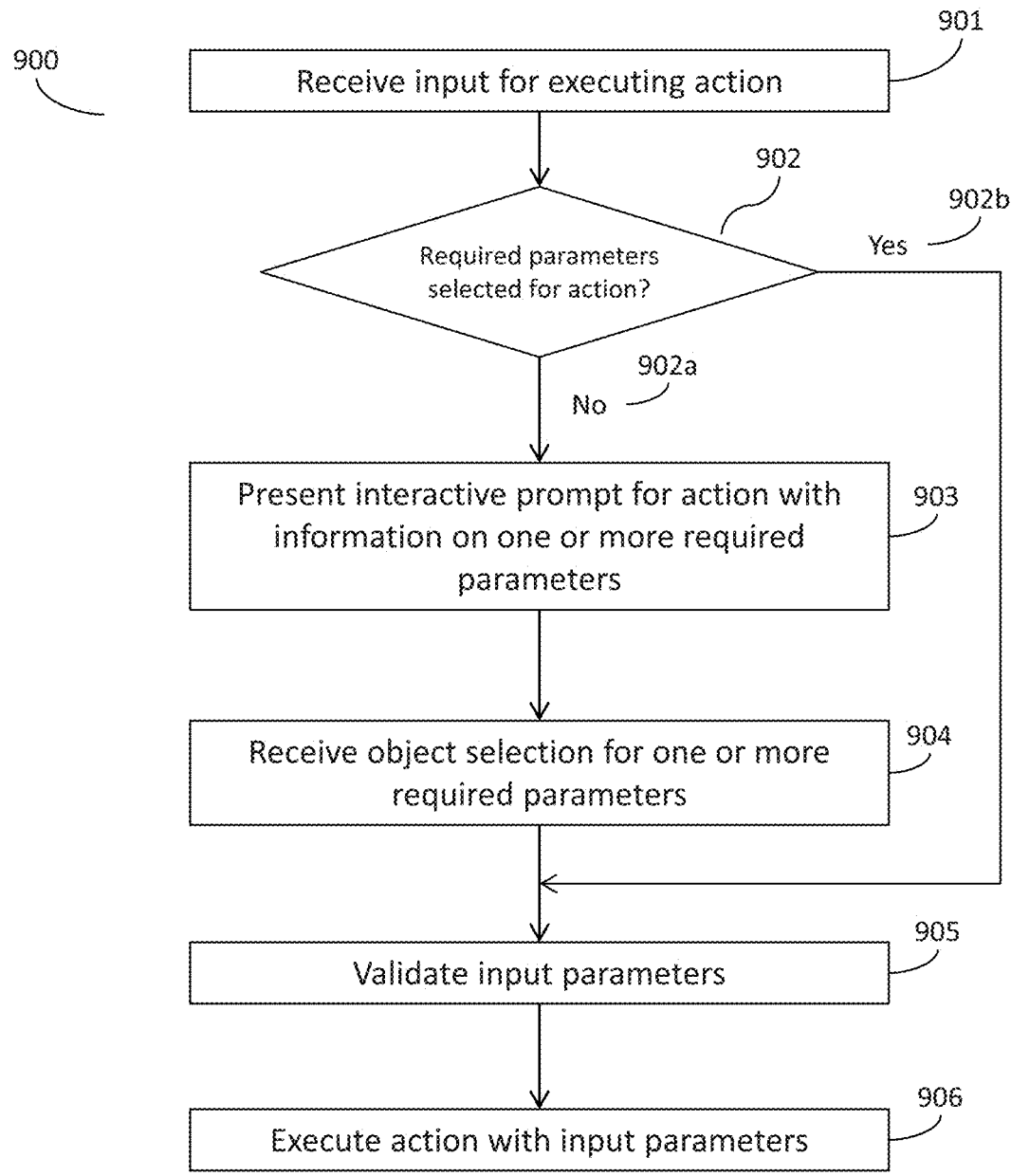
FIG. 9 is a flowchart illustration of a method according to one embodiment of the present disclosure.

Referring now to FIG. 9, a flowchart 900 depicting an example of an embodiment of the present disclosure for an interactive action-object dynamic workflow is provided. At block 901, an input is received for executing an action of the application. The received input may be received via an input interface of a terminal executing the application, such as a mouse, keyboard, touchscreen, stylus input, virtual or augmented reality enabled input, voice input, and the like.

The received input may specify a user action or command to execute with respect to particular data, object, and the like. For example, within a digital content creation (DCC) application used for animation, the received input as shown in FIG. 8A may correspond to a command to create a joint of a character rig for a computer animation project. As discussed with respect to FIG. 6D, the command may correspond to a root of a command DAG or it may correspond to a middle or end node of the command DAG, Next at block 902, the selected parameters (if any) may be checked to see if they satisfy the parameter requirements of the action to be executed. For example, in the parent joint operation discussed in FIG. 8C, the selected objects may be checked to see if they satisfy the input requirements of at least two joints, where one joint is capable of being designated a parent joint, and another joint is capable of being designated a child joint. If block 902 determines that all required parameters have been selected properly, the method may proceed at 902*b* to executing the action using the selected parameters at 905 (discussed further below), without providing any interactive prompt to the user. If the selected parameters do not satisfy the parameter requirements of the action to be executed, the method proceeds at 902*a* to block 903.

At block 903, an interactive prompt may be provided with information on one or more required parameters for executing the action. As discussed with respect to FIG. 8C, the interactive prompt may include information on the action that was selected, the parameters required for the action, and any parameters which have already been correctly selected for the action. In the parent joint example of FIG. 8C, since the first selected joint may already be determined to be correctly selected, the interactive prompt may populate the first parameter value with the selected joint, and additionally prompt for the user to select one or more children.

Next at block 904, selection of one or more objects may be received for input of the required parameters for the action. As discussed with respect to FIG. 8D, the interactive prompt may allow a user to select multiple joints to be input to the child joint input parameter of the parent joint operation.

To indicate that additional selection of parameters may be possible, the interactive prompt may include a visual indicator, such as an underline indicating that the parameter field remains further editable. In other embodiments, other visual cues may be used, such as additional empty spaces, blank input fields, and the like. While the input parameter is shown with focus in the interface, the user can select the child joints and the parameter will be populated, as seen in FIG. 8D. After specifying the children, the action can then be executed upon input by the user, for example by pressing the Enter key or other button or interface object indicating execution.

At block 905, following receiving the object selection for the one or more required parameters, the input objects may be validated to ensure that they are correct for the selected action. In some embodiments, this operation may be performed upon selection or input of each parameter value or object, and thus may be continually performed in response to any changes to the interactive prompt. As discussed, if block 902 determines that all required parameters have been selected properly at 902b, the method may proceed directly to block 905 and the action may execute using the selected parameters and no interactive prompt is provided to the user.

At block 906, the action may be performed with the input parameters selected via the interactive prompt.

Figure 10:
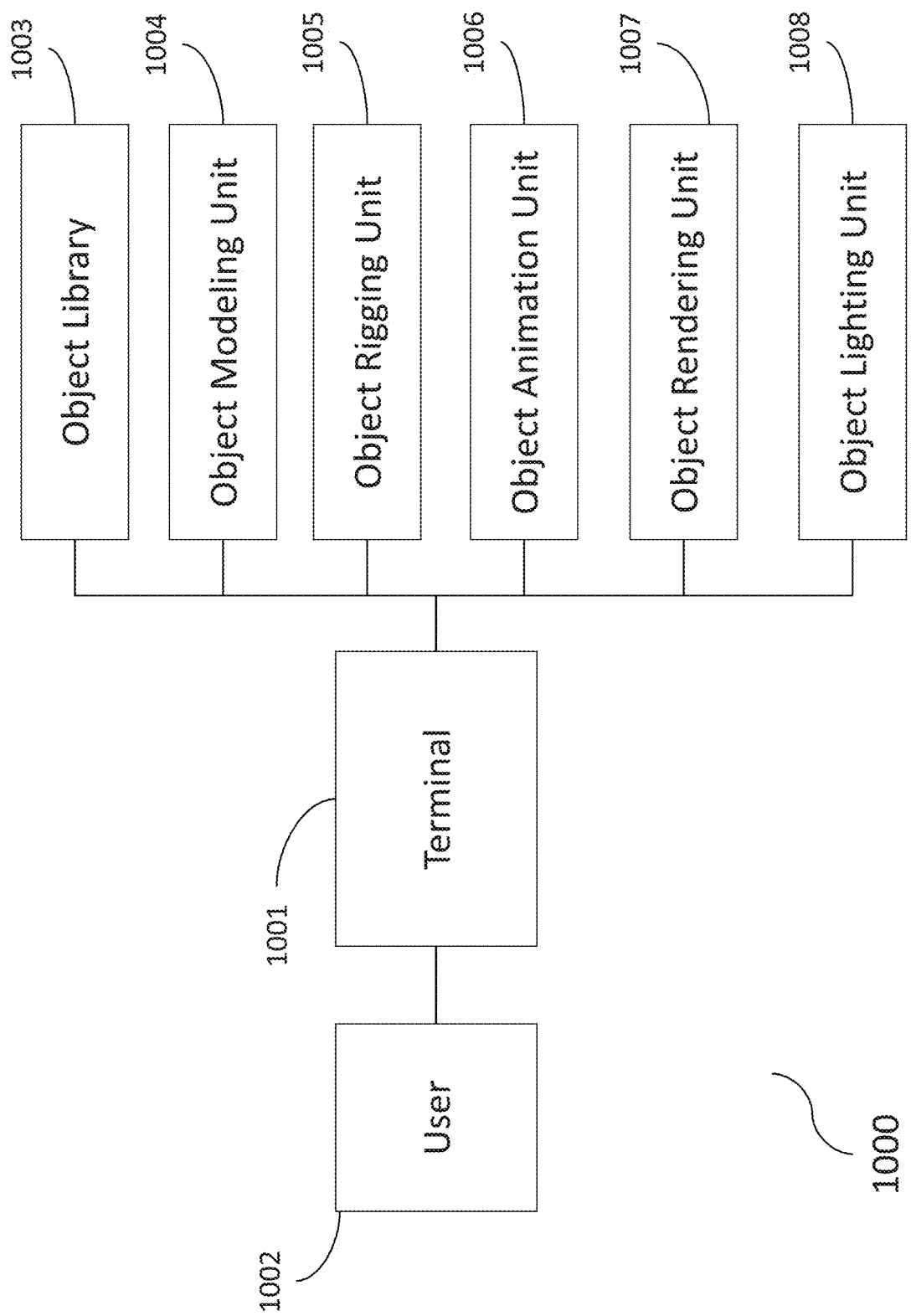
FIG. 10 is a diagram of a system implemented according to an embodiment of the present disclosure.

Referring now to FIG. 10, a simplified block diagram of a system 1000 for creating computer graphics imagery (CGI) and computer-aided animation is shown that may implement or incorporate various embodiments of the present disclosure. The system 1000 may include one or more terminals 1001. The one or more terminals 1001 may include hardware and software elements configured for designing CGI and assisting with computer-aided animation. The terminals 1001 may be implemented as a single computing device or a set of one or more computing devices, corresponding to computer hardware and/or software.

Examples of terminals 1001 may be desktop computers, laptop computers, workstation computers, mainframes, cluster computing systems, cloud computing terminals, embedded computing devices, computer graphics devices, gaming devices and consoles, video media playback devices, consumer electronic devices having programmable processors, or the like. The one or more terminals 1001 may be utilized at various stages of a production process, including pre-production, modeling, designing, creating, editing, simulating, animating, rendering, post-production, finishing, publishing, and the like, to produce recordings, computer files, tangible materials, and the like, related to or comprising images, image sequences, motion pictures, video, audio, or associated effects related to CGI and animation.

In an example of system 1000, a user 1002 may utilize the one or more terminals 1001 to design, create, or modify objects within a computer-generated interface displayed on display associated with the terminal 1001.

The terminal may implement, include, or otherwise be in operable communication with, systems and units including object library 1003, object modeling unit 1004, object rigging unit 1005, object animation unit 1006, object rendering unit 1007, and object lighting unit 1008. Object library 1003 may include software and/or hardware elements configured for storing and accessing information related to objects to be accessed, requested, retrieved, and/or used by the one or more terminals 1001 to design, create, and modify 3D models of objects in the CGI and animation processes.

Object modeling unit 1004 may include software and/or hardware elements and information to be accessed, requested, retrieved, and/or used by the one or more terminals 1001 to sculpt and design the 3D model to take on the desired appearance as instructed by user 1002, or other terminal operator during the CGI and animation process.

Object rigging unit 1005 may include software and/or hardware elements and information to be accessed, requested, retrieved, and/or used by the one or more terminals 1001 to design, create, or modify components of 3D models to define articulation points and movement ranges of various elements of the 3D model.

Object animation unit 1006 may include software and/or hardware elements and information to be accessed, requested, retrieved, and/or used by the one or more terminals 1001 to design, create, or modify animation aspects of a 3D model, including specifying the motion and position of various elements of the 3D model over time during the animation, such as specifying animation paths, cues, or the like or generating key frames or intermediary frames for animated motion of the 3D model.

Object rendering unit 1007 may include software and/or hardware elements and information to be accessed, requested, retrieved, and/or used by the one or more terminals 1001 to design, create, or modify a final appearance of the animated 3D model, including generating one or more images of one or more computer-generated objects, including textures, colors, rigging, controls, and the like.

Object lighting unit 1008 may include software and/or hardware elements and information to be accessed, requested, retrieved, and/or used by the one or more terminals 1001 to design, create, or modify lighting aspects of a 3D model and animated scenes, including defining lighting sources, shading, reflections, refractions, textures, colors, and the like.

The one or more terminals 1001 may be in communication with one or more server computers which may operate in communication with one or more data stores (e.g., databases, indexes, files, or other data structures). The one or more server computers may connect to a data communication network comprising a local area network (LAN), a wide area network (WAN) (e.g., the Internet), a telephone network, a satellite or wireless communication network, or some combination of these or similar networks.

In selected embodiments, the one or more server computers may implement one or more processes, systems, or units of the animation system, including object library 1003, object modeling unit 1004, object rigging unit 1005, object animation unit 1006, object rendering unit 1007, object lighting unit 1008, and the like. The one or more terminals 1001, the one or more server computers, or any other aspect of the system 1000, may be associated or coupled with a display configured to display information, including a displayed interface for displaying, performing, executing, instructing, reviewing, and/or selecting operations of the present disclosure.

Figure 11:
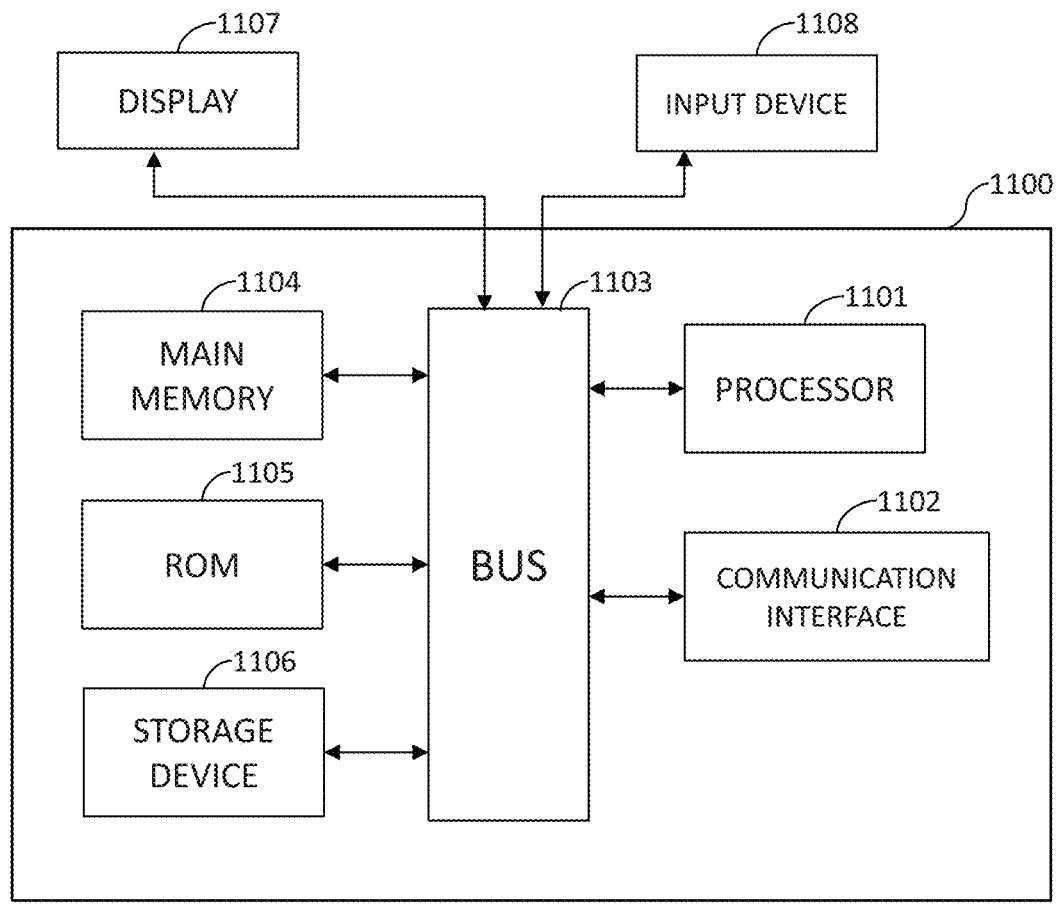
FIG. 11 is a diagram of an apparatus implemented according to an embodiment of the present disclosure.

Referring to FIG. 11, an illustration of an example computer 1100 is provided. One or more of aspects of the system 1000 discussed above in FIG. 10, such as the one or more terminals 1000 or the one or more server computers, may be configured as or include such a computer 1100. In selected embodiments, the computer 1100 may include a bus 1103 (or multiple buses) or other communication mechanism, a processor 1101, main memory 1104, read only memory (ROM) 1105, one or more additional storage devices 1106, and/or a communication interface 1102, or the like or sub-combinations thereof. The embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. In all embodiments, the various components described herein may be implemented as a single component, or alternatively may be implemented in various separate components.

A bus 1103 or other communication mechanism, including multiple such buses or mechanisms, may support communication of information within the computer 1100. The processor 1101 may be connected to the bus 1103 and process information. In selected embodiments, the processor 1101 may be a specialized or dedicated microprocessor configured to perform particular tasks in accordance with the features and aspects disclosed herein by executing machine-readable software code defining the particular tasks. Main memory 1104 (e.g., random access memory—or RAM—or other dynamic storage device) may be connected to the bus 1103 and store information and instructions to be executed by the processor 1101. Main memory 1104 may also store temporary variables or other intermediate information during execution of such instructions.

ROM 1105 or some other static storage device may be connected to a bus 1103 and store static information and instructions for the processor 1101. An additional storage device 1106 (e.g., a magnetic disk, optical disk, memory card, or the like) may be connected to the bus 1103. The main memory 1104, ROM 1105, and the additional storage device 1106 may include a non-transitory computer-readable medium holding information, instructions, or some combination thereof, for example instructions that when executed by the processor 1101, cause the computer 1100 to perform one or more operations of a method as described herein. A communication interface 1102 may also be connected to the bus 1103. A communication interface 1102 may provide or support two-way data communication between a computer 1100 and one or more external devices (e.g., other devices contained within the computing environment).

In selected embodiments, the computer 1100 may be connected (e.g., via a bus) to a display 1107. The display 1107 may use any suitable mechanism to communicate information to a user of a computer 1100. For example, the display 1107 may include or utilize a liquid crystal display (LCD), light emitting diode (LED) display, projector, or other display device to present information to a user of the computer 1100 in a visual display. One or more input devices 1108 (e.g., an alphanumeric keyboard, mouse, microphone, stylus pen) may be connected to the bus 1103 to communicate information and commands to the computer 1100. In selected embodiments, one input device 1108 may provide or support control over the positioning of a cursor to allow for selection and execution of various objects, files, programs, and the like provided by the computer 1100 and displayed by the display 1107.

The computer 1100 may be used to transmit, receive, decode, display, or the like one or more video files. In selected embodiments, such transmitting, receiving, decoding, and displaying may be in response to the processor 1101 executing one or more sequences of one or more instructions contained in main memory 1104. Such instructions may be read into main memory 1104 from another non-transitory computer-readable medium (e.g., a storage device).

Execution of sequences of instructions contained in main memory 1104 may cause the processor 1101 to perform one or more of the procedures or steps described herein. In selected embodiments, one or more processors in a multi-processing arrangement may also be employed to execute sequences of instructions contained in main memory 1104. Alternatively, or in addition thereto, firmware may be used in place of, or in connection with, software instructions to implement procedures or steps in accordance with the features and aspects disclosed herein. Thus, embodiments in accordance with the features and aspects disclosed herein may not be limited to any specific combination of hardware circuitry and software.

Non-transitory computer readable medium may refer to any medium that participates in holding instructions for execution by the processor 1101, or that stores data for processing by a computer, and comprise all computer-readable media, with the sole exception being a transitory, propagating signal. Such a non-transitory computer readable medium may include, but is not limited to, non-volatile media, volatile media, and temporary storage media (e.g., cache memory). Non-volatile media may include optical or magnetic disks, such as an additional storage device. Volatile media may include dynamic memory, such as main memory. Common forms of non-transitory computer-readable media may include, for example, a hard disk, a floppy disk, magnetic tape, or any other magnetic medium, a CD-ROM, DVD, Blu-ray or other optical medium, RAM, PROM, EPROM, FLASH-EPROM, any other memory card, chip, or cartridge, or any other memory medium from which a computer can read.

In selected embodiments, a communication interface 1102 may provide or support external, two-way data communication to or via a network link. For example, a communication interface 1102 may be a wireless network interface controller or a cellular radio providing a data communication network connection. Alternatively, a communication interface 1102 may comprise a local area network (LAN) card providing a data communication connection to a compatible LAN. In any such embodiment, a communication interface 1102 may send and receive electrical, electromagnetic, or optical signals conveying information.

A network link may provide data communication through one or more networks to other data devices (e.g., one or more terminals 1001 as shown in the system 1000). For example, a network link may provide a connection through a local network of a host computer or to data equipment operated by an Internet Service Provider (ISP). An ISP may, in turn, provide data communication services through the Internet. Accordingly, a computer 1100 may send and receive commands, data, or combinations thereof, including program code, through one or more networks, a network link, and communication interface 1102. Thus, the computer 1100 may interface or otherwise communicate with a remote server, or some combination thereof.

The various devices, modules, terminals, and the like discussed herein may be implemented on a computer by execution of software comprising machine instructions read from computer-readable medium, as discussed above. In certain embodiments, several hardware aspects may be implemented using a single computer, in other embodiments multiple computers, input/output systems and hardware may be used to implement the system.

For a software implementation, certain embodiments described herein may be implemented with separate software modules, such as procedures and functions, each of which perform one or more of the functions and operations described herein. The software codes can be implemented with a software application written in any suitable programming language and may be stored in memory and executed by a controller or processor.

The foregoing disclosed embodiments and features are merely exemplary and are not to be construed as limiting the present invention. The present teachings can be readily applied to other types of apparatuses and processes. The description of such embodiments is intended to be illustrative, and not to limit the scope of the claims. Many alternatives, modifications, and variations will be apparent to those skilled in the art.

What is claimed is:

1. A method for executing actions for generating an animation character rig, the method comprising:

receiving one or more inputs selecting one or more objects of the character rig;

providing an action executable on the selected one or more objects;

providing a prompt indicating one or more parameters required for the action, wherein the prompt includes an object of the selected one or more objects as a parameter, and wherein based on a determination that the selected one or more objects do not satisfy the one or more parameters of the action, the prompt includes at least one empty parameter field for the action requiring selection of one or more additional objects;

executing the action in response to an execution input based on a determination that the one or more parameters of the action are satisfied.

2. The method of claim 1, wherein the prompt further includes a type indicator associated with the at least one empty parameter field, wherein the type indicator indicates a type of the one or more additional objects that are required to be selected.

3. The method of claim 2, further comprising:

receiving additional one or more inputs selecting the one or more additional objects; and displaying the prompt to include the selected one or more additional objects in addition to the selected one or more objects as the one or more parameters of the action.

4. The method of claim 1, wherein the at least one empty parameter field is expanded based on receiving additional one or more inputs selecting the one or more additional objects and a number of the selected one or more additional objects is greater than a number of the at least one empty parameter field before expansion, and further based on a determination that the action is configured to receive additional parameters for execution of the action.

5. The method of claim 4, further comprising providing a visual indicator associated with the at least one empty parameter field after receiving each of the additional one or more inputs, wherein the visual indicator indicates that more additional objects may be selected as the additional parameters for execution of the action.

6. The method of claim 1, further comprising providing a list of candidate objects of the character rig which are selectable to satisfy the one or more parameters of the action.

7. The method of claim 1, further comprising providing a selection indicator on the one or more objects of the character rig indicating that the one or more objects are selected as the one or more parameters.

8. A method for executing actions for generating an animation character rig, the method comprising:

providing a prompt including at least one empty parameter field indicating one or more parameters required for execution of an action, wherein the prompt includes a type indicator associated with the at least one empty parameter field indicating a type of one or more objects that are required to be selected as the one or more parameters;

receiving one or more inputs selecting one or more objects of the character rig as the one or more parameters for the action, wherein based on a determination that the selected one or more objects do not satisfy the one or more parameters of the action, the prompt provides at least one empty parameter field for the action requiring selection of one or more additional objects;

executing the action in response to an execution input based on a determination that the one or more parameters of the action are satisfied.

9. The method of claim 8, wherein the at least one empty parameter field is expanded based on receiving additional one or more inputs selecting the one or more additional objects and a number of the one or more additional objects is greater than a number of the at least one empty parameter field before expansion, and further based on a determination that the action is configured to receive additional parameters for execution of the action.

10. The method of claim 9, further comprising providing a visual indicator associated with the at least one empty parameter field after receiving each of the additional one or more inputs, wherein the visual indicator indicates that more additional objects may be selected as the additional parameters for execution of the action.

11. The method of claim 8, further comprising providing a list of candidate objects of the character rig which are selectable to satisfy the one or more parameters of the action.

12. A machine-readable non-transitory medium having stored thereon machine-executable instructions for executing actions for generating an animation character rig, the instructions comprising:

receiving one or more inputs selecting one or more objects of the character rig;

providing an action executable on the selected one or more objects;

providing a prompt indicating one or more parameters required for the action, wherein the prompt includes an object of the selected one or more objects as a parameter, and wherein based on a determination that the selected one or more objects do not satisfy the one or more parameters of the action, the prompt includes at least one empty parameter field for the action requiring selection of one or more additional objects;

executing the action in response to an execution input based on a determination that the one or more parameters of the action are satisfied.

13. The machine-readable non-transitory medium of claim 12, wherein the prompt further includes a type indicator associated with the at least one empty parameter field, wherein the type indicator indicates a type of the one or more additional objects that are required to be selected.

14. The machine-readable non-transitory medium of claim 13, wherein the instructions further comprise:

receiving additional one or more inputs selecting the one or more additional objects; and displaying the prompt to include the selected one or more additional objects in addition to the selected one or more objects as the one or more parameters of the action.

15. The machine-readable non-transitory medium of claim 12, wherein the at least one empty parameter field is expanded based on receiving additional one or more inputs selecting the one or more additional objects and a number of the one or more additional objects is greater than a number of the at least one empty parameter field before expansion, and further based on a determination that the action is configured to receive additional parameters for execution of the action.

16. The machine-readable non-transitory medium of claim 15, wherein the instructions further comprise providing a visual indicator associated with the at least one empty parameter field after receiving each of the additional one or more inputs, wherein the visual indicator indicates that more additional objects may be selected as the additional parameters for execution of the action.

17. The machine-readable non-transitory medium of claim 12, wherein the instructions further comprise providing a list of candidate objects of the character rig which are selectable to satisfy the one or more parameters of the action.

\* \* \* \* \*